US012739847B2

(12) United States Patent
Song et al.

(10) Patent No.: US 12,739,847 B2
(45) Date of Patent: Sep. 15, 2026

(54) TRANSMISSION RESOURCE DETERMINATION METHOD AND APPARATUS, AND STORAGE MEDIUM

(71) Applicant: Datang Mobile Communications Equipment Co., Ltd., Beijing (CN)

(72) Inventors: Lei Song, Beijing (CN); Xin Su, Beijing (CN); Qiubin Gao, Beijing (CN); Lei Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 546 days.

(21) Appl. No.: 18/250,217

(22) PCT Filed: Oct. 21, 2021

(86) PCT No.: PCT/CN2021/125292

§ 371 (c)(1),
(2) Date: Apr. 23, 2023

(87) PCT Pub. No.: WO2022/083691

PCT Pub. Date: Apr. 28, 2022

(65) Prior Publication Data

US 2023/0403720 A1 Dec. 14, 2023

(30) Foreign Application Priority Data

Oct. 23, 2020 (CN) ......................... 202011149241.4

(51) Int. Cl.
*H04W 72/232* (2023.01)
*H04W 72/12* (2023.01)

(52) U.S. Cl.
CPC ......... *H04W 72/232* (2023.01); *H04W 72/12* (2013.01)

(58) Field of Classification Search
CPC ....... H04L 1/08; H04L 5/0053; H04L 5/0094; H04L 12/12; H04W 72/0453;
(Continued)

(56) References Cited

U.S. PATENT DOCUMENTS 11,330,577 B2 * 5/2022 Hosseini ............... H04W 72/23
12,082,016 B2 * 9/2024 Kim ...................... H04W 72/23
(Continued)

FOREIGN PATENT DOCUMENTS

CN 101883369 A 11/2010
CN 104349458 A 2/2015
(Continued)

OTHER PUBLICATIONS

European Patent Office, the Extended European Search Report Issued in Application No. 21882106.4, Mar. 26, 2024 Germany, 9 pages.

(Continued)

*Primary Examiner* — Eric Nowlin
(74) *Attorney, Agent, or Firm* — KILPATRICK TOWNSEND & STOCKTON LLP

(57) ABSTRACT

Embodiments of the present disclosure provide a determining transmission resources method and apparatus, and a storage medium. The method includes receiving first configuration information transmitted by a network side device, and the first configuration information is used for indicating a repetition of a physical downlink control channel (PDCCH); and determining an association between resources used by two or more repetitions of PDCCH or determining the resources used by the two or more repetitions of PDCCH based on one or more of the first configuration information, a first PDCCH association configured by the network side device and a predefined second PDCCH association. The present disclosure can reduce the complex-
(Continued)

Receiving first configuration information transmitted by a network side device, where the first configuration information is used for indicating a repetition of a physical downlink control channel (PDCCH) — 101

Determining an association between resources used by two or more repetitions of the PDCCH or determining the resources used by the two or more repetitions of the PDCCH based on one or more of the first configuration information, a first PDCCH association configured by the network side device and a predefined second PDCCH association — 102 ity of blind detection of a terminal device and the number and range of attempts for blind combination.

9 Claims, 5 Drawing Sheets

(58) Field of Classification Search
CPC ............. H04W 72/12; H04W 72/1273; H04W 72/23; H04W 72/232; H04W 80/06
See application file for complete search history.

(56) References Cited

U.S. PATENT DOCUMENTS

| | | | | |
|---|---|---|---|---|
| 12,238,695 | B2* | 2/2025 | Kim | H04W 72/046 |
| 12,452,868 | B2* | 10/2025 | Choi | H04L 5/0094 |
| 12,471,113 | B2* | 11/2025 | Zhang | H04W 72/0446 |
| 2019/0222400 | A1 | 7/2019 | Bagheri et al. | |
| 2020/0008235 | A1 | 1/2020 | Sarkis et al. | |
| 2020/0045696 | A1* | 2/2020 | Huang | H04L 5/0007 |
| 2020/0221431 | A1* | 7/2020 | Hosseini | H04L 5/0053 |
| 2021/0385826 | A1* | 12/2021 | Moon | H04W 72/23 |
| 2022/0217694 | A1* | 7/2022 | Kim | H04L 1/1864 |
| 2022/0264339 | A1* | 8/2022 | Kim | H04L 1/00 |
| 2022/0304037 | A1* | 9/2022 | Zhang | H04L 5/0053 |
| 2023/0126574 | A1* | 4/2023 | Ji | H04W 72/046 370/329 |
| 2023/0156665 | A1* | 5/2023 | Gao | H04L 5/0091 370/329 |
| 2023/0217460 | A1* | 7/2023 | Zhang | H04W 72/0446 370/329 |
| 2023/0262705 | A1* | 8/2023 | Choi | H04W 72/21 370/329 |
| 2024/0356705 | A1* | 10/2024 | Zhang | H04B 7/0408 |
| 2024/0397355 | A1* | 11/2024 | Kim | H04W 72/046 |
| 2025/0338290 | A1* | 10/2025 | MolavianJazi | H04W 24/08 |

FOREIGN PATENT DOCUMENTS

| | | | | | |
|---|---|---|---|---|---|
| CN | 104811409 | A | | 7/2015 | |
| CN | 105164963 | A | | 12/2015 | |
| CN | 109768849 | A | | 5/2019 | |
| CN | 110536451 | A | | 12/2019 | |
| CN | 110868240 | A | | 3/2020 | |
| CN | 111431685 | A | | 7/2020 | |
| CN | 111435869 | A | | 7/2020 | |
| CN | 111435870 | A | | 7/2020 | |
| CN | 116671219 | A | * | 8/2023 | H04L 5/0094 |
| CN | 119948974 | A | * | 5/2025 | H04L 1/08 |
| EP | 4033833 | A1 | * | 7/2022 | H04W 72/23 |
| KR | 20200024653 | A | | 3/2020 | |
| WO | 2012003675 | A1 | | 1/2012 | |
| WO | 2019139955 | A1 | | 7/2019 | |
| WO | WO-2022131872 | A1 | * | 6/2022 | H04W 72/23 |
| WO | WO-2022145882 | A1 | * | 7/2022 | H04W 72/23 |

OTHER PUBLICATIONS

Taiwan Patent Office, First Office Action Issued in Application No. 110139526, Aug. 10, 2022, 11 pages.

State Intellectual Property Office of the People's Republic of China, first office action Issued in Application No. 202011149241.4, May 24, 2023, 9 pages.

CATT,"Discussion on enhancements on multi-TRP/panel for PDCCH, PUCCH and PUSCH", 3GPP TSG RAN WG1 Meeting #102e, e-Meeting, Aug. 17-28, 2020, total 8 pages, R1-2005684.

International Search Report received in the corresponding International Application PCT/CN2021/125292, mailed Jan. 12, 2022.

* cited by examiner

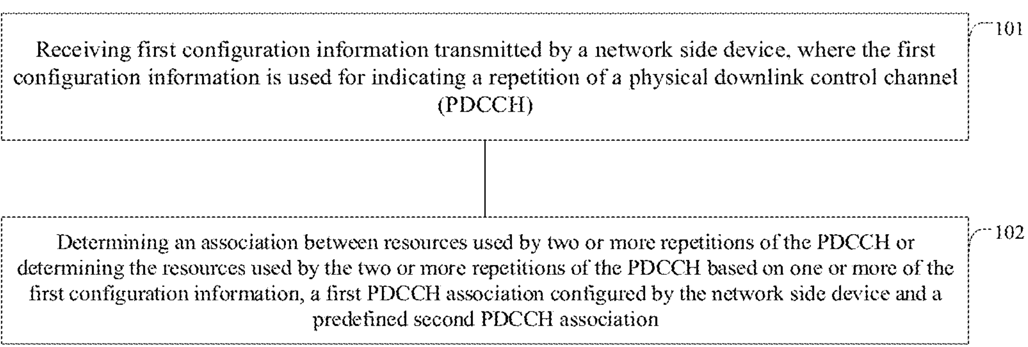

FIG. 1

Transmitting first configuration information used for indicating a repetition of a PDCCH to the terminal device, where the terminal device determines a association between resources used by two or more repetitions of the PDCCH or determines the resources used by two or more repetitions of the PDCCH based on one or more of the first configuration information, a first PDCCH association configured by a network side device and a predefined second PDCCH association

Repetitions of one DCI signaling

SS set 1

SS set 2

SS set 3

SS set 4

Slot 1 Slot 2 Slot 3 Slot 4 Slot 5 Slot 6 Slot 7 Slot 8

FIG. 3

TRANSMISSION RESOURCE DETERMINATION METHOD AND APPARATUS, AND STORAGE MEDIUM

CROSS-REFERENCE TO RELATED APPLICATION

The present application is a National Stage of International Application No. PCT/CN2021/125292, which claims priority to Chinese application No. 2020111492414 filed on Oct. 23, 2020, entitled "Transmission Resource Determination Method and Apparatus, and Storage Medium", which is incorporated herein by reference in its entirety.

FIELD

The present application relates to the field of communication technologies, and in particular, to methods and apparatuses for determining a transmission resource, and a storage medium.

BACKGROUND

In a current new radio (NR) system, downlink control information (DCI) is not transmitted in a repetition manner, that is, one DCI is transmitted only in one physical downlink control channel in one scheduling device. The specification specifies the maximum number of physical downlink control channel (PDCCH) candidates that can be monitored in each slot under each sub-carrier spacing configuration.

In order to improve a transmission reliability of a physical downlink control channel, different transmission configuration indication (TCI) states (that is, beams) may be used by multiple transmission reception pPoints (TRPs) to transmit same PDCCHs for a terminal device. After receiving the PDCCHs transmitted by the multiple transmission reception points, multiple PDCCHs may be combined at a maximal ratio, and then demodulation and decoding operations are performed. Compared with a case where PDCCHs are only transmitted by a single transmission reception point, transmission reliabilities of the PDCCHs is significantly improved.

However, according to the current specification, PDCCH candidates that the terminal device may blindly detect in a slot has limited maximum number. If two or more PDCCH candidates may transmit same DCI, the terminal device will combine, decode and perform other operations on the two or more PDCCH candidates, which may significantly increase a complexity. In addition, due to a limited blind detection capability of the terminal device, the terminal device cannot determine a correct combination of PDCCH candidates (that is, a combination of multiple PDCCH candidates that transmit same control information) when an upper limit number of blind detection is reached, and thus cannot decode correct control information.

SUMMARY

Embodiments of the present application provide methods and apparatuses for determining a transmission resource, and a storage medium, which can solve a problem in the related art that the terminal device cannot determine a correct combination of PDCCH candidates when an upper limit of blind detection numbers is reached.

To solve the above problem, embodiments of the present application provide the following solutions.

An embodiment of the present application provides a method for determining a transmission resource, including:

receiving first configuration information transmitted by a network side device, where the first configuration information is used for indicating a repetition of a physical downlink control channel (PDCCH); and determining an association between resources used by two or more repetitions of PDCCH or determining the resources used by the two or more repetitions of PDCCH based on one or more of the first configuration information, a first PDCCH association configured by the network side device and a predefined second PDCCH association.

In an embodiment, the first PDCCH association includes one or more of:

two or more control resource set (CORESET) indexes;

two or more search space set (SS set) indexes;

two or more PDCCH candidate indexes;

an aggregation level of a SS set and/or a PDCCH candidate; and the given one of PDCCH association patterns configured by the network side device.

In an embodiment, the first PDCCH association further includes one or more of a time-domain parameter, a frequency-domain parameter or a repetition number, where the time-domain parameter includes one or more of:

a periodicity and/or an offset; and slot information;

where the frequency-domain parameter includes one or more of:

a bandwidth part (BWP) index; and a cell index.

In an embodiment, the periodicity and/or offset include:

a set of periodicity and/or offset for indicating same periodicity and/or offset for two or more control resource set (CORESET) indexes, the two or more SS set indexes or two or more PDCCH candidate indexes; and two or more sets of periodicity and/or offset for indicating periodicity and/or offset of each CORESET index in the two or more CORESET index, periodicity and/or offset of each SS set index in the two or more SS set indexes, and/or offset of each PDCCH candidate index the two or more PDCCH candidate indexes, respectively.

In an embodiment, the method for determining a transmission resource further includes:

determining one or more of a SS set to be monitored, a PDCCH candidate and a CORESET based on a periodicity and/or offset configured by a higher layer parameter and a periodicity and/or offset configured for the SS set.

In an embodiment, the determining one or more of a SS set to be monitored, a PDCCH candidate or a CORESET based on a periodicity and/or offset configured by a higher layer parameter and a periodicity and/or offset configured by a SS set includes any one of:

determining one or more of the SS set to be monitored, the PDCCH candidate and the CORESET as an intersection of the periodicity and/or offset configured by the higher layer parameter and the periodicity and/or offset configured for the SS set; and determining one or more of the SS set to be monitored, the PDCCH candidate and the CORESET as a union of the periodicity and/or offset configured by the higher layer parameter and the periodicity and/or offset configured for the SS set.

In an embodiment, the method for determining a transmission resource further includes:

determining the number of the determined one or more of the SS set to be monitored, the PDCCH candidate and the CORESET as an actual repetition number.

In an embodiment, the determining the number of one or more of the determined SS set to be monitored, the PDCCH candidate and the CORESET as an actual repetition number includes any one of:

determining the number of the determined one or more of the SS set to be monitored, the PDCCH candidate and the CORESET as the actual repetition number, and one or more of each SS set, each PDCCH candidate and each CORESET carry one repetition; and determining a predefined repetition number as the actual repetition number, and determining that a SS set or a PDCCH candidate with a smaller index carries two or more repetitions in case that the number of SS sets or PDCCH candidates is less than the predefined repetition number.

In an embodiment, the time-domain parameter includes one or more of:

two or more sets of periodicity and/or offset corresponding to a CORESET, and one or more sets of periodicity and/or offset in the two or more sets of periodicity and/or offset correspond to a repetition of the PDCCH, and one or more sets of periodicity and/or offset in the two or more sets of periodicity and/or offset correspond to a non-repetition of the PDCCH;

two or more sets of periodicity and/or offset corresponding to a SS set, and one or more sets of periodicity and/or offset in the two or more sets of periodicity and/or offset correspond to a repetition of the PDCCH, and one or more sets of periodicity and/or offset in the two or more sets of periodicity and/or offset correspond to a non-repetition of the PDCCH; and two or more sets of periodicity and/or offset corresponding to a PDCCH candidate, and one or more sets of periodicity and/or offset in the two or more sets of periodicity and/or offset correspond to a repetition of the PDCCH, and one or more sets of periodicity and/or offset in the two or more sets of periodicity and/or offset correspond to a non-repetition of the PDCCH.

In an embodiment, the slot information includes one or more of:

an index of a slot where a CORESET is located;
an index of a slot where a SS set is located; and
an index of a slot where a PDCCH candidate is located.

In an embodiment, the first PDCCH association includes one or more of:

two or more dedicated CORESET indexes;
two or more dedicated SS set indexes;
two or more dedicated PDCCH candidate indexes; and
one or more of dedicated CORESET index, SS set index and PDCCH candidate index.

In an embodiment, the first configuration information is used for indicating one or more of:

the repetition of the PDCCH corresponding to the same DCI;

the repetition of the PDCCH corresponding to different parts of the same DCI;

the repetition of the PDCCH corresponding to different DCI;

the repetition of the PDCCH corresponding to two or more DCI with different information fields or different DCI formats;

a repetition of a PDCCH corresponding to two or more DCI for scheduling the same physical downlink shared channel (PDSCH) or the same physical uplink shared channel (PUSCH);

the repetition of the PDCCH corresponding to DCI with the same purpose; and a PDCCH multiplexing transmission scheme being one or more of: time division multiplexing, frequency division multiplexing, space division multiplexing, intra-CORESET multiplexing, inter-CORESET multiplexing, intra-slot multiplexing and inter-slot multiplexing.

In an embodiment, the second PDCCH association includes one or more of:

the PDCCH is transmitted in SS sets having the same relative index of an SS set in different CORESETs;

the PDCCH is transmitted in SS sets having the same relative index of an SS set to be monitored in different CORESETs;

the PDCCH is transmitted in PDCCH candidates having the same PDCCH candidate index in different SS sets, where the PDCCH candidates have the same aggregation level or different aggregation levels;

the PDCCH is transmitted in PDCCH candidates having the same aggregation level in different CORESETs or SS sets;

the PDCCH is transmitted in PDCCH candidates having the same aggregation level in the same CORESET or SS set;

a mapping relationship between the repetition PDCCH and the multiple CORESETs, the multiple SS sets or the multiple PDCCH candidates; and an association among the multiple CORESET indexes, multiple SS set indexes or multiple PDCCH candidate indexes.

In one embodiment of the present application further provides a method for determining a transmission resource, including:

transmitting first configuration information to a terminal device, and the first configuration information is used for indicating a repetition of a physical downlink control channel (PDCCH), where the terminal device determines an association between resources used by two or more repetitions of PDCCH or determine the resources used by two or more repetitions of PDCCH based on one or more of the first configuration information, a first PDCCH association configured by a network side device and a predefined second PDCCH association.

In an embodiment, the first PDCCH association includes one or more of:

two or more CORESET indexes;
two or more SS set indexes;
two or more PDCCH candidate indexes;
an aggregation level of a SS set and/or a PDCCH candidate; and
the given one of PDCCH association patterns configured by the network side device.

In an embodiment, the first PDCCH association further includes one or more of a time-domain parameter, a frequency-domain parameter and a repetition number, where the time-domain parameter includes one or more of:

periodicity and/or offset; and
slot information;

where the frequency-domain parameter includes one or more of:

a BWP index; and a cell index.

In an embodiment, the periodicity and/or offset include:

a set of periodicity and/or offset for indicating same periodicity and/or offset for two or more control resource set (CORESET) indexes, the two or more SS set indexes or two or more PDCCH candidate indexes; and two or more sets of periodicity and/or offset for indicating periodicity and/or offset of each CORESET index in the two or more CORESET indexes, periodicity and/or offset of each SS set index in the two or more SS set indexes or periodicity and/or offset of each PDCCH candidate index in the two or more PDCCH candidate indexes, respectively.

In an embodiment, the time-domain parameter includes one or more of:

two or more sets of periodicity and/or offset corresponding to a CORESET, and one or more sets of periodicity and/or offset in the two or more sets of periodicity and/or offset correspond to a repetition of PDCCH, and one or more sets of periodicity and/or offset in the two or more sets of periodicity and/or offset correspond to a non-repetition of the PDCCH;

two or more sets of periodicity and/or offset corresponding to a SS set, and one or more sets of periodicity and/or offset in the two or more sets of periodicity and/or offset correspond to a repetition of the PDCCH, and one or more sets of periodicity and/or offset in the two or more sets of periodicity and/or offset correspond to a non-repetition of the PDCCH; and two or more sets of periodicity and/or offset corresponding to a PDCCH candidate, and one or more sets of periodicity and/or offset in the two or more sets of periodicity and/or offset correspond to a repetition of PDCCH, and one or more sets of periodicity and/or offset in the two or more sets of periodicity and/or offset correspond to a non-repetition of the PDCCH.

In an embodiment, the first configuration information is used for indicating one or more of:

the repetition of the PDCCH corresponding to the same DCI;

the repetition of the PDCCH corresponding to different parts of the same DCI;

the repetition of the PDCCH corresponding to different DCI;

the repetition of the PDCCH corresponding to two or more DCI with different information fields or different DCI formats;

the repetition of the PDCCH corresponding to two or more DCI for scheduling the same physical downlink shared channel (PDSCH) or the same physical uplink shared channel (PUSCH);

the repetition of the PDCCH corresponding to DCI with the same purpose; and a PDCCH multiplexing transmission scheme being one or more of: time division multiplexing, frequency division multiplexing, space division multiplexing, intra-CORESET multiplexing intra-CORESET multiplexing, intra-slot multiplexing and inter-slot multiplexing.

In an embodiment, the second PDCCH association includes one or more of:

the PDCCH is transmitted in SS sets having the same relative index of an SS set in different CORESETs;

the PDCCH is transmitted in SS sets having the same relative index of an SS set to be monitored in different CORESETs;

the PDCCH is transmitted in PDCCH candidates having the same PDCCH candidate index in different SS sets, where the PDCCH candidates have the same aggregation level or different aggregation levels;

the PDCCH is transmitted in PDCCH candidates having the same aggregation level in different CORESETs or SS sets;

the PDCCH is transmitted in PDCCH candidates having the same aggregation level in the same CORESET or SS set;

a mapping relationship between the repetition PDCCH and the multiple CORESETs, multiple SS sets or multiple PDCCH candidates; and an association among multiple CORESET indexes, multiple SS set indexes and multiple PDCCH candidate indexes.

In one embodiment of the present application further provides an apparatus for determining a transmission resource, including:

a receiving device, used to receive first configuration information transmitted by a network side device, and the first configuration information is used for indicating a repetition of a PDCCH; and a determining device, used to determine an association between resources used by two or more repetitions of the PDCCH or determining the resources used by two or more repetitions of the PDCCH based on one or more of the first configuration information, a first PDCCH association configured by the network side device and a predefined second PDCCH association.

In one embodiment of the present application further provides an apparatus for determining a transmission resource, including:

a transmitting device, used to transmit first configuration information to the terminal device, where the first configuration information is used for indicating a repetition of a physical downlink control channel (PDCCH), where the terminal device determines an association between resources used by two or more repetitions of the PDCCH or determines the resources used by two or more repetitions of the PDCCH based on one or more of the first configuration information, a first PDCCH association configured by a network side device and a predefined second PDCCH association.

In one embodiment of the present application further provides a terminal device, including a memory, a processor and a computer program stored on the memory and executable by the processor, where the computer program, when executed by the processor, cause the processor to:

receive first configuration information transmitted by a network side device, and the first configuration information is used for indicating a repetition of a physical downlink control channel (PDCCH); and determine an association between resources used by two or more repetitions of the PDCCH or determine the resources used by the two or more repetitions of the PDCCH based on one or more of the first configuration information, a first PDCCH association configured by the network side device and a predefined second PDCCH association.

In an embodiment, the first PDCCH association includes one or more of:

two or more CORESET indexes;

two or more SS set indexes;

two or more PDCCH candidate indexes;

an aggregation level of SS set and/or PDCCH candidate; and the given one of PDCCH association patterns configured by the network side device.

In an embodiment, the first PDCCH association further includes one or more of a time-domain parameter, a frequency-domain parameter or a repetition number, where the time-domain parameter includes one or more of:

periodicity and/or offset; and slot information;

where the frequency-domain parameter includes one or more of:

a BWP index; and a cell index.

In an embodiment, the periodicity and/or offset include:

a set of periodicity and/or offset for indicating same periodicity and/or offset for two or more control resource set (CORESET) indexes, the two or more SS set indexes or two or more PDCCH candidate indexes; and two or more sets of periodicity and/or offset for indicating periodicity and/or offset of each CORESET index in the two or more CORESET indexes, periodicity and/or offset of each SS set index in the two or more SS set indexes or periodicity and/or offset of each PDCCH candidate index in the two or more PDCCH candidate indexes, respectively.

In an embodiment, the computer program, when executed by the processor, causes the processor further to:

determine one or more of a SS set to be monitored, a PDCCH candidate and a CORESET based on a periodicity and/or offset configured by a higher layer parameter and a periodicity and/or offset configured by a SS set.

In an embodiment, determining the one or more of the SS set to be monitored, the PDCCH candidate and the CORESET based on the periodicity and/or offset configured by a higher layer parameter and the periodicity and/or offset configured by a SS set includes any one of:

determining one or more of the SS set to be monitored, the PDCCH candidate and the CORESET as an intersection of the periodicity and/or offset configured by the higher layer parameter and the periodicity and/or offset configured for the SS set; and determining the one or more of the SS set to be monitored, the PDCCH candidate and the CORESET as a union of the periodicity and/or offset configured by the higher layer parameter and the periodicity and/or offset configured for the SS set.

In an embodiment, and the computer program, when executed by the processor, causes the processor further to:

determine the number of the determined one or more of the SS set to be monitored, the PDCCH candidate and the CORESET as an actual repetition number.

In an embodiment, herein determining the number of the determined one or more of the SS set to be monitored, the PDCCH candidate and the CORESET as an actual repetition number includes any one of:

determining the number of the determined one or more of the SS set to be monitored, the PDCCH candidate and the CORESET as the actual repetition number, and one or more of each SS set, each PDCCH candidate or each CORESET carries one repetition; and determining a predefined repetition number as the actual repetition number, and determining that a SS set or PDCCH candidate with a smaller index carries two or more repetitions in case that the number of SS sets or PDCCH candidates is less than the predefined repetition number.

In an embodiment, the time-domain parameter includes one or more of:

two or more sets of periodicity and/or offset corresponding to a CORESET, and one or more sets of periodicity and/or offset in the two or more sets of periodicity and/or offset correspond to a repetition of the PDCCH, and one or more sets of periodicity and/or offset in the two or more sets of periodicity and/or offset correspond to a non-repetition of the PDCCH;

two or more sets of periodicity and/or offset corresponding to a SS set, and one or more sets of periodicity and/or offset in the two or more sets of periodicity and/or offset correspond to a repetition of the PDCCH, and one or more sets of periodicity and/or offset in the two or more sets of periodicity and/or offset correspond to a non-repetition of the PDCCH; and two or more sets of periodicity and/or offset corresponding to a PDCCH candidate, and one or more sets of periodicity and/or offset in the two or more sets of periodicity and/or offset correspond to a repetition of the PDCCH, and one or more sets of periodicity and/or offset in the two or more sets of periodicity and/or offset correspond to a non-repetition of the PDCCH.

In an embodiment, the slot information includes one or more of:

an index of a slot where a CORESET is located;

an index of a slot where a SS set is located; and an index of a slot where a PDCCH candidate is located.

In an embodiment, the first PDCCH association includes one or more of:

two or more dedicated CORESET indexes;

two or more dedicated SS set indexes;

two or more dedicated PDCCH candidate indexes; and one or more of dedicated CORESET index, SS set index and PDCCH candidate index.

In an embodiment, the first configuration information is used for indicating one or more of:

the repetition of the PDCCH corresponding to the same DCI;

the repetition of the PDCCH corresponding to different parts of same DCI;

the repetition of the PDCCH corresponding to different DCI;

the repetition of the PDCCH corresponding to two or more DCI with different information fields or different DCI formats;

the repetition of the PDCCH corresponding to two or more DCI for scheduling the same physical downlink shared channel (PDSCH) or the same physical uplink shared channel (PUSCH);

the repetition of the PDCCH corresponding to DCI with the same purpose; and a PDCCH multiplexing transmission scheme being one or more of: time division multiplexing, frequency division multiplexing, space division multiplexing, intra-CORESET multiplexing, inter-CORESET multiplexing, intra-slot multiplexing and inter-slot multiplexing.

In an embodiment, the second PDCCH association includes one or more:

the PDCCH is transmitted in SS sets having the same relative index of an SS set in different CORESETs;

the PDCCH is transmitted in SS sets having the same relative index of a SS set to be monitored in different CORESETs;

the PDCCH is transmitted in PDCCH candidates having the same PDCCH candidate index in different SS sets, where the PDCCH candidates have the same aggregation level or different aggregation levels;

the PDCCH is transmitted in PDCCH candidates having the same aggregation level in different CORESETs or SS sets;

the PDCCH is transmitted in PDCCH candidates having the same aggregation level in the same CORESET or SS set;

a mapping relationship between the repetition PDCCH and multiple CORESETs, multiple SS sets or multiple PDCCH candidates; and an association among the multiple CORESET indexes, multiple SS set indexes or multiple PDCCH candidate indexes.

In one embodiment of the present application further provides a network side device, including a memory, a processor and a computer program stored on the memory and executable by the processor, and the computer program, when executed by the processor, causes the processor to:

transmit first configuration information for indicating a repetition of a physical downlink control channel (PDCCH) to a terminal device, where the terminal device determines an association between resources used by two or more repetitions of the PDCCH or determine the resources used by two or more repetitions of the PDCCH based on one or more of the first configuration information, a first PDCCH association configured by a network side device and a predefined second PDCCH association.

In an embodiment, the first PDCCH association includes one or more of:

two or more CORESET indexes;

two or more SS set indexes;

two or more PDCCH candidate indexes;

an aggregation level of SS set and/or PDCCH candidate; and the given one of PDCCH association patterns configured by the network side device.

In an embodiment, the first PDCCH association further includes one or more of a time-domain parameter, a frequency-domain parameter or a repetition number, where the time-domain parameter includes one or more of:

periodicity and/or offset; and slot information;

where the frequency-domain parameter includes one or more of:

a BWP index; and a cell index.

In an embodiment, the periodicity and/or offset include:

a set of periodicity and/or offset for indicating same periodicity and/or offset for two or more CORESET indexes, the two or more SS set indexes or two or more PDCCH candidate indexes; and two or more sets of periodicity and/or offset for indicating periodicity and/or offset of each CORESET index in of the two or more CORESET indexes, periodicity and/or offset of each SS set index in the two or more SS set indexes or periodicity and/or offset of each PDCCH candidate index in the two or more PDCCH candidate indexes, respectively.

In an embodiment, the time-domain parameter includes one or more of:

two or more sets of periodicity and/or offset corresponding to a CORESET, and one or more sets of periodicity and/or offset in the two or more sets of periodicity and/or offset correspond to a repetition of the PDCCH, and one or more sets of periodicity and/or offset in the two or more sets of periodicity and/or offset correspond to a non-repetition of the PDCCH;

two or more sets of periodicity and/or offset corresponding to a SS set, and one or more sets of periodicity and/or offset in the two or more sets of periodicity and/or offset corresponds to a repetition of the PDCCH, and one or more sets of periodicity and/or offset in the two or more sets of periodicity and/or offset correspond to a non-repetition of the PDCCH; and two or more sets of periodicity and/or offset corresponding to a PDCCH candidate, and one or more sets of periodicity and/or offset in the two or more sets of periodicity and/or offset correspond to a repetition of the PDCCH, and one or more sets of periodicity and/or offset in the two or more sets of periodicity and/or offset correspond to a non-repetition of the PDCCH.

In an embodiment, the first configuration information is used for indicating one or more of:

the repetition of the PDCCH corresponding to the same DCI;

the repetition of the PDCCH corresponding to different parts of the same DCI;

the repetition of the PDCCH corresponding to different DCI;

the repetition of the PDCCH corresponding to two or more DCI with different information fields or different DCI formats;

the repetition of the PDCCH corresponding to two or more DCI for scheduling the same physical downlink shared channel (PDSCH) or the same physical uplink shared channel (PUSCH);

the repetition of the PDCCH corresponding to DCI with the same purpose; and a PDCCH multiplexing transmission scheme being one or more of: time division multiplexing, frequency division multiplexing, space division multiplexing, intra-CORESET multiplexing, inter-CORESET multiplexing, intra-slot multiplexing and inter-slot multiplexing.

In an embodiment, the second PDCCH association includes one or more of:

the PDCCH is transmitted in SS sets having the same relative index of an SS set in different CORESETs;

the PDCCH is transmitted in SS sets having the same relative index of an SS set to be monitored in different CORESETs;

the PDCCH is transmitted in PDCCH candidates having the same PDCCH candidate index in different SS sets, where the PDCCH candidates have same aggregation level or different aggregation levels;

the PDCCH is transmitted in PDCCH candidates having the same aggregation level in different CORESETs or SS sets;

the PDCCH is transmitted in PDCCH candidates having the same aggregation levels in the same CORESET or SS set;

a mapping relationship between the repetition PDCCHs and the multiple CORESETs, multiple SS sets or multiple PDCCH candidates; and an association among the multiple CORESET indexes, multiple SS set indexes or multiple PDCCH candidate indexes.

In one embodiment of the present application further provides a processor readable storage medium having a computer program stored thereon that, when executed by a processor, causes the processor to perform the steps of the methods for determining a transmission resource described above.

In the methods and apparatuses for determining a transmission resource and a storage medium according to the embodiments of the present application, an association between resources used by two or more repetitions of PDCCH or resources used by the two or more repetitions of PDCCH may be determined based on one or more of a first configuration information transmitted by the network side device, a first PDCCH association configured by the network side device and the predefined second PDCCH association. In this way, the complexity of blind detection and the numbers of attempts for blind combination, as well as the ranges for attempts can be reduced.

BRIEF DESCRIPTION OF THE DRAWINGS

In order to more clearly illustrate the solutions disclosed in the embodiments of the present application or the related art, the drawings used in the descriptions of the embodiments or the related art will be briefly described below. The drawings in the following description are some embodiments of the present application.

FIG. 1 is a flowchart of a method for determining a transmission resource d applied to a terminal device according to an embodiment of the present application;

FIG. 2 is a flowchart of a method for determining a transmission resource applied to a network side device according to an embodiment of the present application;

FIG. 3 is a schematic diagram for configuring the same set of periodicity and/or offset for an associated SS set according to an embodiment of the present application;

DETAILED DESCRIPTION

Figure 4:
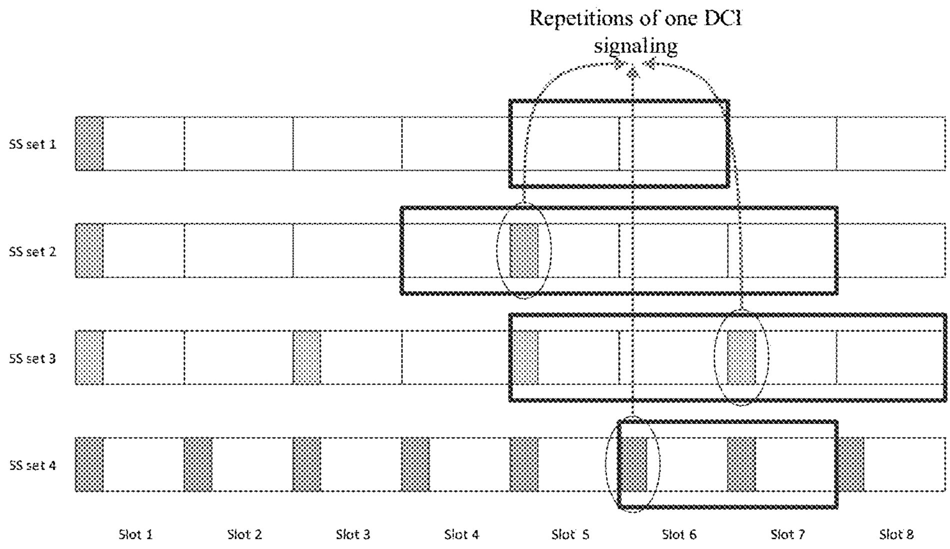
FIG. 4 is a schematic diagram of configuring multiple sets of periodicity and/or offset for an associated SS set according to an embodiment of the present application.

Solutions in embodiments of the present application will be described clearly and completely with reference to the drawings in the embodiments of the present application. These embodiments are only some of the embodiments of the present application, and not all of the embodiments.

In this embodiment, it should be indicated that in a current new radio (NR) system, downlink control information (DCI) is not transmitted in a repetition manner. That is, the DCI is transmitted in only one physical downlink control channel in one scheduling device. The specification specifies the maximum number of physical downlink control channel (PDCCH) candidates that may be monitored in each of slots under each of sub-carrier spacing configurations, which is, for example, $$M_{PDCCH}^{max,slot,\mu}$$

shown in the following table 1. In addition, the number of PDCCH candidates configured by a network side device may be greater than the maximum value specified in the following table 1, and the maximum number of PDCCH detection performed by a terminal device may be the maximum number specified in the following table 1.

Table 1 the maximum number of monitored PDCCH candidates per slot and for a downlink (DL) bandwidth portion (BWP) with sub-carrier spacing configuration is μ∈{0, 1, 2, 3} for a single serving cell $$M_{PDCCH}^{max,slot,\mu}$$

| μ | Maximum number of monitored PDCCH candidates per slot and per serving cell $M_{PDCCH}^{max,slot,\mu}$ |
|---|---|
| 0 | 44 |
| 1 | 6 |
| 2 | 22 |
| 3 | 20 |

In order to improve transmission reliability of a physical downlink control channel, multiple transmission reception points (TRPs) may transmit the same PDCCHs to a terminal device using different transmission configuration indication (TCI) states (i.e., beams). After receiving the PDCCHs transmitted from the multiple transmission reception points, the terminal device may perform maximal ratio combining on the multiple PDCCHs, and then perform operations of demodulation and decoding. Compared with a case where the PDCCHs are transmitted by only one single transmission reception point, the transmission reliability of the PDCCHs is significantly improved.

However, according to the current specifications, the maximum number of PDCCH candidates that may be blindly decoded per slot by the terminal device is limited. If any two or more PDCCH candidates transmit the same DCI, the terminal device will perform operations such a combining and decoding on the two or more PDCCH candidates, to increase the complexity. In addition, due to a limited capability for blind detection of the terminal device, the terminal device may not determine a correct combination of PDCCH candidates (that is, a combination of multiple PDCCH candidates that transmit the same control information) when an upper limit for the number of blind detection is reached, and thus the correct control information cannot be determined. In order to enable the terminal device to determine the combination of multiple PDCCH candidates corresponding to the same control information within the limited number for blind detection, the present application provides a method for determining a transmission resource. That is, the present application enables the network side device to provide an association between multiple PDCCH candidates corresponding to the same control information.

Considering the problem that a control channel may be transmitted in a repetition manner and it is complex to perform joint decoding operations on the two repetition versions, the present application provides a method for configuring the association between the control channels, which may also be referred to as a method for determining a transmission resource. The method is used to indicate a positional relationship between time frequency resources of the two repetition versions, and to reduce the numbers of attempts for blind detection and blind combination performed at the terminal device. The methods and apparatuses for determining a transmission resource and a storage medium proposed in the present application will be explained and described in detail by means of specific embodiments.

It should be note that since the methods and the devices are based on the same application concept and have the same principles for solving the problem, the implementation of the apparatuses and the methods may be referred to each other and repetitions thereof will be omitted.

Further, it should be note that the solutions according to the embodiments of the present application may be applicable to various systems, especially a 5G system. For example, the applicable systems may include a global system of mobile communication (GSM), a code division multiple access (CDMA) system, a wideband code division multiple access (WCDMA) general packet radio service (GPRS) system, a long term evolution (LTE) system, a LTE frequency division duplex (FDD) system, a LTE time division duplex (TDD) system, a long term evolution advanced (LTE-A) system, a universal mobile telecommunication system (UMTS), a worldwide interoperability for microwave access (WiMAX) system, a 5G New Radio (NR) system, and the like. Each of the various systems may include a terminal device and a network side device. Each of the systems may also include a core network part such as an evolved packet system (EPS), a 5G system (5GS), and the like.

The terminal device in the embodiments of the present application may be a device that provides voice and/or data connectivity to a user, a handheld device with wireless connection capability, or other processing device connected to a wireless modem. In different systems, the names of the terminal device may be different. For example, in a 5G system, a terminal device may be referred to as user equipment (UE). A wireless terminal device may communicate with one or more core networks (CN) via a radio access network (RAN). The wireless terminal device may include a mobile terminal device such as a mobile phone (or "cellular" phone), and a computer containing the mobile terminal device. The wireless terminal device for example may include a portable mobile device, a pocket-sized mobile device, a hand-held mobile device, a computer-built mobile device or a vehicle-mounted mobile device that exchanges language and/or data with the radio access network. For example, the wireless terminal device may include a personal communication service (PCS) phone, a radio phone, a session-initiated protocol (SIP) phone, a wireless local loop (WLL) station, a personal digital assistant (PDA) and the like. A wireless terminal device may also be referred to as a system, a subscriber device, a subscriber station, a mobile station, a mobile, a remote station, an access point, a remote terminal device, an access terminal device, a user terminal device, a user agent, or a user device, which are not limited in the embodiments of the present application. Since the terminal device and other network side devices (such as a core network side device, an access network side device (i.e., base station)) form a network that may support communication, the terminal device may be also considered as a network side device in the present application.

The network side device involved in the embodiments of the present application may include a base station covering multiple cells providing services for terminal devices and a central unit (CU) or a distributed unit (DU). Depending on specific applications, the base station may also be referred to as an access point, or a device in the access network that communicates with a wireless terminal device through one or more sectors on the air interface, or other names. The network side device may be used to exchange received air frames with Internet protocol (IP) packets, and act as a router between wireless terminal device and the rest of the access network, and the rest of the access network may include an IP communication network. The network side devices may also coordinate attribute management for the air interface. For example, the network side device in the embodiments of the present application may include a base transceiver station (BTS) in a global system for mobile communications (GSM) or a code division multiple access (CDMA). It may also include a node B in a wide-band code division multiple access (WCDMA). It may further include an evolutional node B (eNB or e-Node B) in a long term evolution (LTE) system, a 5G base station (gNB) in 5G network architecture (next generation system), may also be a home evolved node B (HeNB), a relay node, a femto, a pico, etc., which are not limited in the embodiments of the present application. In some network structures, a network side device may include a centralized unit (CU) node and a distributed unit (DU) node, and the centralized unit and the distributed unit may also be geographically separated.

In the embodiments of the present application, the term "and/or" describes a related relationship of associated objects, and indicates that there may be three kinds of relationships. For example, A and/or B may represent that A exists alone, A and B exist simultaneously, and B exists alone. Character "/" generally indicates that the associated objects have an "or" relationship.

"One embodiment" or "an embodiment" throughout the specification means that specific features, structures or characteristics related to the embodiment are included in one or more embodiment of the present application. Therefore, the words "in one embodiment" or "in one embodiment" appearing throughout the entire specification may not necessarily refer to the same embodiment. In addition, these specific features, structures or characteristics may be combined in one or more embodiments in any suitable methods.

The present application is described in detail below.

As shown in FIG. 1, which is a flowchart of a method for determining a transmission resource applied to a terminal device according to an embodiment of the present application, the method includes the following steps:

step 101: receiving first configuration information transmitted by a network side device. The first configuration information is used for indicating a repetition of a physical downlink control channel (PDCCH);

step 102: determining an association between resources used by two or more repetitions of the PDCCH or determining the resources used by the two or more repetitions of the PDCCH based on one or more of the first configuration information, a first PDCCH association configured by a network side device and a predefined second PDCCH association.

In this embodiment, the terminal device, after receiving the first configuration information transmitted by the network side device that indicates the repetition of the PDCCH, may determine the association between the resources used by the two or more repetitions of the PDCCH or the resources used by the two or more repetitions of the PDCCH based on the first configuration information.

In this embodiment, the terminal device may determine the association between the resources used by the two or more repetitions of the PDCCH or the resources used by two or more repetitions of the PDCCH based on the PDCCH associations configured by the network side device. In addition, the terminal device may also determine the association between the resources used by the two or more repetitions of the PDCCH or the resources used by the two or more repetitions of the PDCCH based on a predefined PDCCH association. In addition, the terminal device may also determine the association between the resources used by the two or more repetitions of the PDCCH or the resources used by the two or more repetitions of the PDCCH based on the PDCCH associations configured by the network side device and the predefined PDCCH association.

In this embodiment, the terminal device should finally determine the resources for the two or more repetitions of the PDCCH based on the first configuration information. Therefore, in an implementation, the resources for the two or more repetitions of the PDCCH may be determined directly. In addition, the association between the resources used by the two or more repetitions of the PDCCH may be determined, and the resources used by the two or more repetitions of the PDCCH may be further determined based on the association between the resources used by the two or more repetitions of the PDCCH.

In this embodiment, the first configuration information may include first configuration information for indicating the repetition of the PDCCH corresponding to the same DCI. The first configuration information may also be used for indicating the repetition of the PDCCH corresponding to different parts of the same DCI. The first configuration information may further be used for indicating the repetition of the PDCCH corresponding to different DCI. The first configuration information may further be used for indicating the repetition of the PDCCH corresponding to two or more DCI with different information fields or different DCI formats. The first configuration information may further be used for indicating the repetition of the PDCCH corresponding to two or more DCI for scheduling the same physical downlink shared channel (PDSCH) or the same physical uplink shared channel (PUSCH). The first configuration information may further be used for indicating the repetition of the PDCCH corresponding to DCI with the same purpose. It is not limited in this embodiment.

In the method for determining a transmission resource according to the embodiments of the present application, an association between resources used by two or more repetitions of PDCCH or resources used by the two or more repetitions of the PDCCH may be determined based on the first configuration information transmitted by the network side device, the first PDCCH association configured by the network side device and the predefined second PDCCH association. In this way, the complexity of blind detection and the numbers of attempts for blind combination, as well as the ranges for attempts, may be reduced.

In an embodiment, the method for determining a transmission resource further includes:

determining one or more of a SS set to be monitored, a PDCCH candidate and a CORESET based on a periodicity and/or offset configured by a higher layer parameter and a periodicity and/or offset configured for the SS set.

In this embodiment, one or more of the SS set to be monitored, the PDCCH candidate and/or the CORESET may be determined based on the periodicity and/or offset configured by the higher layer parameter and the periodicity and/or offset configured for the SS set. Specifically, the determining may include any one of: i) determining the one or more of the SS set to be monitored, the PDCCH candidate or the CORESET as an intersection of the periodicity and/or offset configured by the higher layer parameter and the periodicity and/or offset configured for the SS set; and ii) determining one or more of the SS set to be monitored, the PDCCH candidate or the CORESET as a union of the periodicity and/or offset configured by the higher layer parameter and the periodicity and/or offset configured for the SS set.

In this embodiment, different methods for determining one or more of the SS set to be monitored, the PDCCH candidate and the CORESET based on the periodicity and/or offset configured by the higher layer parameter and the periodicity and/or offset configured for the SS set are provided, and a suitable combination of SS set to be monitored and/or PDCCH candidate and/or CORESET may be selected as needed in a specific use case.

In this embodiment, the method for determining a transmission resource may further include:

determining the number of the determined one or more of the SS set to be monitored, the PDCCH candidate and the CORESET as an actual repetition number.

In this embodiment, the numbers of the determined SS set to be monitored, the PDCCH candidate and the CORESET may be determined as an actual repetition number, and thus the process of separately determining the repetition number is omitted.

Based on the above embodiments, determining the number of the determined one or more of the SS set to be monitored, the PDCCH candidate and the CORESET as an actual repetition number includes any one of:

determining the number of the determined one or more of the SS set to be monitored, the PDCCH candidate and the CORESET as the actual repetition number, and one or more of each SS set, each PDCCH candidate and each CORESET carry one repetition; and determining a predefined repetition number as the actual repetition number, and determining that a SS set or a PDCCH candidate with a smaller index carries two or more repetitions in case that the number of SS sets or PDCCH candidates is less than the predefined repetition number.

In this embodiment, different methods for determining the repetition number are provided, and the different methods for determining the repetition number correspond to different processing methods. For example, when determining the number of the determined one or more of the SS set to be monitored, the PDCCH candidate and the CORESET as the actual repetition number, it is required that each SS set, each PDCCH candidate and each CORESET carry one repetition. When determining a predefined repetition number as the actual repetition number, it is required that a SS set or a PDCCH candidate with a smaller index carries two or more repetitions in case that the number of SS sets or PDCCH candidates is less than the predefined repetition number, and to meet requirements of repetitions.

Based on the above embodiments, the PDCCH association configured by the network side device includes one or more of:

two or more control resource set (CORESET) indexes;

two or more search space set (SS) set indexes;

two or more PDCCH candidate indexes;

an aggregation level of a SS set and/or a PDCCH candidate; and the given one of PDCCH association patterns configured by the network side device.

In this embodiment, various situations of PDCCH associations configured by the network side device are provided. In practical application, different methods for indicating PDCCH association may be selected based on different situations, for example, a CORESET index, a SS set index, a PDCCH candidate index and the like may be used.

Based on the above embodiments, the PDCCH association configured by the network side device further includes one or more of:

a time-domain parameter;

a frequency-domain parameter; and a repetition number.

The PDCCH association configured by the network side device may further include a time-domain parameter (such as a periodicity and/or offset), a frequency-domain parameter (such as a bandwidth part (BWP) index, a cell index, etc.), and may further include a repetition number.

Based on the above embodiments, the time-domain parameter includes one or more of:

periodicity and/or offset; and slot information.

Based on the above embodiments, the frequency-domain parameters include one or more of:

a BWP index; and a cell index.

When the frequency-domain parameter is not configured, the terminal device defaults that an actuating range of the PDCCH association configured by the network side device is a current BWP or an active BWP. That is, multiple PDCCHs are transmitted within the current BWP or the active BWP. When the frequency-domain parameter is configured, it indicates that the actuating range of the PDCCH association is on an indicated BWP index or cell index. That is, multiple PDCCHs are transmitted on an indicated BWP or cell, or each PDCCH is transmitted on its own configured frequency-domain. Similar to the time-domain parameter, the configured frequency-domain parameters may be one set of frequency-domain parameters corresponding to all PDCCHs, or it may be multiple sets of frequency-domain parameters with each PDCCH has different frequency-domain parameters.

Based on the above embodiments, the periodicity and/or offset include:

a set of periodicity and/or offset for indicating same periodicity and/or offset of the two or more CORESET indexes, the two or more SS set indexes or the two or more PDCCH candidate indexes; and two or more sets of periodicity and/or offset for indicating periodicity and/or offset of each CORESET index in the two or more CORESET indexes, periodicity and/or offset of each SS set index in the two or more SS set indexes or periodicity and/or offset of each PDCCH candidate index in the two or more PDCCH candidate indexes, respectively.

Based on the above embodiments, the time-domain parameters include one or more of:

two or more sets of periodicity and/or offset corresponding to a CORESET, and one or more sets of periodicity and/or offset in the two or more sets of periodicity and/or offset correspond to a repetition of the PDCCH, and one or more sets of periodicity and/or offset in the two or more sets of periodicity and/or offset correspond to a non-repetition of the PDCCH;

two or more sets of periodicity and/or offset corresponding to a SS set, and one or more sets of periodicity and/or offset in the two or more sets of periodicity and/or offset correspond to a repetition of the PDCCH, and one or more sets of periodicity and/or offset in the two or more sets of periodicity and/or offset correspond to a non-repetition of the PDCCH; and two or more sets of periodicity and/or offset corresponding to a PDCCH candidate, and one or more sets of periodicity and/or offset in the two or more sets of periodicity and/or offset correspond to a repetition of the PDCCH, and one or more sets of periodicity and/or offset in the two or more sets of periodicity and/or offset correspond to a non-repetition of the PDCCH.

Based on the above embodiments, the slot information includes one or more of:

an index of a slot where a CORESET is located;

an index of a slot where a SS set is located; and an index of a slot where a PDCCH candidate is located.

Based on the above embodiments, the PDCCH association configured by the network side device includes one or more of:

two or more dedicated CORESET indexes;

two or more dedicated SS set indexes;

two or more dedicated PDCCH candidate indexes; and one or more of dedicated CORESET index, SS set index and PDCCH candidate index.

The two or more dedicated CORESET indexes refer to that two or more CORESETs are dedicated to PDCCH repetition, and not to other transmissions.

The two or more dedicated SS set indexes refer to that two or more SS sets are dedicated to PDCCH repetition, and not to other transmissions.

The two or more dedicated PDCCH candidate indexes refer to that there are two or more dedicated PDCCH candidates dedicated to PDCCH repetition, and not to other transmissions.

The one or more of dedicated CORESET index, SS set index and PDCCH candidate index refer to one or more of CORESET, SS set and PDCCH candidate are dedicated to PDCCH repetition rather than other transmissions.

In addition, the dedicated CORESET, SS set or PDCCH candidate may also be used in conjunction with other methods. For example, the network side device configures the terminal device to transmit PDCCHs in two or more associated SS sets or PDCCH candidates within a dedicated CORESET, or configures the terminal device to transmit PDCCHs in two or more associated PDCCH candidates within a dedicated SS set.

Based on the above embodiments, the first configuration information may be further used for indicating one or more of:

- the repetition of the PDCCH corresponding to the same DCI;
- the repetition of the PDCCH corresponding to different parts of the same DCI;
- the repetition of the PDCCH corresponding to different DCI;
- the repetition of the PDCCH corresponding to two or more DCI with different information fields or different DCI formats;
- a repetition of a PDCCH corresponding to two or more DCI for scheduling the same physical downlink shared channel (PDSCH) or the same physical uplink shared channel (PUSCH);
- the repetition of the PDCCH corresponding to DCI with the same purpose; and
- a PDCCH multiplexing transmission scheme being one or more of: time division multiplexing, frequency division multiplexing, space division multiplexing, intra-CORESET multiplexing, inter-CORESET multiplexing, intra-slot multiplexing and inter-slot multiplexing.

In this embodiment, different implementations of the first configuration information are provided. For example, the first configuration information may be the first configuration information indicate the repetition of the PDCCH corresponding to the same DCI. It may also be the first configuration information for indicating the repetition of the PDCCH corresponding to different parts of the same DCI. It may also be the first configuration information for indicating the repetition of the PDCCH corresponding to different DCI. It may be seen that the association between the resources used by two or more repetitions of the PDCCH or the resources used to determine two or more repetitions of the PDCCH may correspond to the same DCI, different parts of same DCI, different DCI or other DCI having different formats. It is not limited in this embodiment.

Based on the above embodiments, the predefined PDCCH association includes one or more of:

- the PDCCH is transmitted in SS sets having the same relative index of an SS set in different CORESETs;
- the PDCCH is transmitted in SS sets having the same relative index of an SS set to be monitored in different CORESETs;
- the PDCCH is transmitted in PDCCH candidates having the same PDCCH candidate index in different SS sets, where the PDCCH candidates have the same aggregation level or different aggregation levels;
- the PDCCH is transmitted in PDCCH candidates having the same aggregation level in different CORESETs or SS sets;
- the PDCCH is transmitted in PDCCH candidates having the same aggregation level in same CORESETs or SS sets;
- a mapping relationship between the repetition PDCCH and the multiple CORESETs, multiple SS sets or multiple PDCCH candidates; and
- an association among the multiple CORESET indexes, multiple SS set indexes and multiple PDCCH candidate indexes.

In this embodiment, several predefined PDCCH associations are provided. Through these predefined PDCCH associations, the association between the resources used by two or more repetitions of the PDCCH or the resources used by two or more repetitions of the PDCCH may be determined, and the terminal device may determine multiple PDCCH candidate combinations within a limited number of blind detections. For example, multiple PDCCH candidate combinations corresponding to the same control information may be determined within a limited number of blind detections, attempt number and ranges for blind detections and blind combination performed by the terminal device are reduced. This embodiment may indicate a position relationship between time frequency resources of two repetition versions based on the predefined PDCCH association, attempt number and ranges for blind detections and blind combination performed by the terminal device are reduced.

As shown in FIG. 2, which is a flowchart of a method for determining a transmission resource applied to a network side device according to an embodiment of the present application, the method includes the following step:

- step 201: transmitting first configuration information to the terminal device, where the first configuration information is used for indicating a repetition of a PDCCH, where the terminal device determines an association between resources used by two or more repetitions of the PDCCH or determine the resources used by two or more repetitions of the PDCCH based on one or more of the first configuration information, a first PDCCH association configured by a network side device and a predefined second PDCCH association.

In the method for determining a transmission resource according to the embodiments of the present application, an association between resources used by two or more repetitions of the PDCCH or resources used by the two or more repetitions of the PDCCH may be determined based on the first configuration information transmitted by the network side device, the first PDCCH association configured by the network side device and the predefined second PDCCH association, both complexity and attempt number and ranges for blind detections and blind combination performed by the terminal device are reduced.

Based on the above embodiments, the first configuration information is used for indicating one or more of:

- the repetition of the PDCCH corresponding to the same DCI;
- the repetition of the PDCCH corresponding to different parts of the same DCI;
- the repetition of the PDCCH corresponding to different DCI;
- the repetition of the PDCCH corresponding to two or more DCI with different information fields or different DCI formats;
- a repetition of a PDCCH corresponding to two or more DCI for scheduling the same physical downlink shared channel (PDSCH) or the same physical uplink shared channel (PUSCH);
- the repetition of the PDCCH corresponding to DCI with the same purpose; and
- a PDCCH multiplexing transmission scheme being one or more of: time division multiplexing, frequency division multiplexing, space division multiplexing, intra-CORESET multiplexing, inter-CORESET multiplexing, intra-slot multiplexing and inter-slot multiplexing.

Based on the above embodiments, the PDCCH association configured by the network side device includes one or more of:

two or more control resource set (CORESET) indexes;

two or more search space set (SS) set indexes;

two or more PDCCH candidate indexes;

an aggregation level of SS set and/or PDCCH candidate; and the given one of PDCCH association patterns configured by the network side device.

Based on the above embodiments, the predefined PDCCH association includes one or more of:

the PDCCH is transmitted in SS sets having the same relative index of an SS set in different CORESETs;

the PDCCH is transmitted in SS sets having the same relative index of an SS set to be monitored in different CORESETs;

the PDCCH is transmitted in PDCCH candidates having the same PDCCH candidate index in different SS sets, where the PDCCH candidates have the same aggregation level or different aggregation levels;

the PDCCH is transmitted in PDCCH candidates having the same aggregation level in different CORESETs or SS sets;

the PDCCH is transmitted in PDCCH candidates having the same aggregation level in same CORESETs or SS sets;

a mapping relationship between the repetition of the PDCCH and the multiple CORESETs, multiple SS sets or multiple PDCCH candidates; and an association among the multiple CORESET indexes, multiple SS set indexes and multiple PDCCH candidate indexes.

The present application will be described in detail through specific embodiments.

Embodiment 1: the association is configured by the network side device.

The network side device indicates two or more SS sets by utilizing a higher layer parameter (such as repetition_pattern) or reusing a current higher layer parameter, or two or more PDCCH candidates carry same control information. The higher layer parameter includes two or more SS set indexes or PDCCH candidate indexes. In addition, the higher layer parameter further includes time-domain information and/or repetition number of the two or more SS sets or PDCCH candidates.

For example, the higher layer parameter is used to explicitly configure that the following L SS sets are associated (that is, they transmit the same control information and may be combined and decoded), such as SS set 1, SS set 2, SS set 3 and SS set 4 are associated. The value of L may be equal to PDCCH repetition number K, which means that each SS set may only transmit one PDCCH repetition version. The value of L may also not be equal to PDCCH repetition number K. For example, L is less than K, which means that one SS set may transmit multiple PDCCH repetition versions.

In all embodiments of the present application, the PDCCH repetition version or the DCI signaling repetition version may be the same DCI signaling, two or more DCI signaling with different individual information fields or different DCI formats, or two or more DCI signaling for scheduling the same PDSCH/PUSCH or for the same purpose (such as triggering CSI reporting, indicating a slot format, indicating a power control parameter, etc.). Similarly, PDCCH repetition or DCI signaling repetition may be the same DCI signaling repetition, or two or more DCI signaling repetition with different individual information fields or different DCI formats, or two or more DCI signaling repetition for scheduling the same PDSCH/PUSCH or for the same purpose (such as triggering CSI reporting, indicating a slot format, indicating a power control parameter, etc.).

In one embodiment, the higher layer parameter is used to explicitly configure that the following M PDCCH candidates are associated. For example, an index a of a PDCCH candidate of SS set 1 and an index b of a PDCCH candidate of SS set 2 are associated. The value of M may be equal to the number K of PDCCH repetitions.

In one embodiment, associated SS sets or PDCCH candidates are configured under a current higher layer parameter SearchSpace. For example, SS set 1 is configured to be associated with SS set 2, SS set 3 and SS set 4 under the configuration of SearchSpace of SS set 1; SS set 2 is configured to be associated with SS set 1, SS set 3 and SS set 4 under the configuration of SearchSpace of SS set 2; SS set 3 is configured to be associated with SS set 1, SS set 2 and SS set 4 under the configuration of SearchSpace of SS set 3; SS set 3 is configured to be associated with SS set 1, SS set 2 and SS set 3 under the configuration of SearchSpace of SS set 4. In one embodiment, an index a of a PDCCH candidate in SS set 1 is configured to be associated with an index b of a PDCCH candidate in SS set 2.

In addition, when the PDCCH candidate association is configured, the corresponding aggregation level (AL) is further configured. For example, an index a of the PDCCH candidate having AL 8 of SS set 1 is configured to be associated with index b of the PDCCH candidate having AL 16 of SS set 2 through the higher layer parameter repetition_pattern. In one embodiment, an index a of the PDCCH candidate of SS set 1 is configured to be associated with an index b of the PDCCH candidate of SS set 2, where all associated PDCCH candidates have AL 8. The association is configured similarly through SearchSpace, that is, the AL is explicitly configured, which may further reduce both complexity in blind detection and attempt number and ranges for performing combining. When the AL is not configured, index a and index b of the PDCCH candidate may correspond to indexes for AL 1, 2, 4, 8, 16 respectively, and the terminal device needs to search all possible ALs. After the AL is configured, the terminal device only needs to search the index of PDCCH candidate for the configured AL, which greatly reduces complexities of blind detection and blind combination.

In addition, one or more CORESETs, SS sets or PDCCH candidates may be explicitly configured for PDCCH repetition and are not used for transmission of other control information or control channels indicated through a higher layer parameter. For example, a higher layer parameter repetition_pattern_specific (a higher layer parameter independent of higher layer parameter ControlResourceSet or SearchSpace, or not in the higher layer parameter ControlResourceSet or SearchSpace) is used for indicating that CORESET A, B and C are used for transmission of a PDCCH repetition version, and these CORESETs are not used for transmissions of control information or control channels other than PDCCH. In addition, the number of PDCCH repetitions included in each CORESET may also be configured. Similarly, the higher layer parameter repetition_pattern_specific indicates that SS sets i, j, k and l may be used for transmission of a PDCCH repetition version, and these SS sets are not used for transmissions of control information or control channels other than PDCCH. In addition, the number of PDCCH repetitions included in each SS set may also be configured. Similarly, the repetition_pattern_specific may also indicate that PDCCH candidate indexes a, b, c and d are used for transmission of a PDCCH repetition version, and these PDCCH candidates are not used for transmissions of control information or control channels other than PDCCH. In addition, the number of PDCCH repetitions included in each PDCCH candidate may also be configured; and ALs corresponding to each PDCCH candidate may also be configured during configuration. Through the above configurations, the terminal device may determine that the configured CORESET, SS set or PDCCH candidate is only used for PDCCH repetition, and may further determine that PDCCH repetition is only within ranges of the configured CORESET, SS set or PDCCH candidate. In addition, after analyzing one or more PDCCH repetition versions, the terminal device will not continue to detect the above CORESET, SS set or PDCCH candidate, which reduces the complexity of blind detection. In one embodiment, a higher layer parameter (such as repetition_indicator) is configured in the current higher layer parameter ControlResourceSet or SearchSpace to indicate that a certain CORESET or SS set is used for PDCCH repetition rather than transmissions of control information or control channels. In addition, the number of PDCCH repetitions included in each CORESET or SS set may also be configured; and a higher layer parameter (such as repetition_pattern_indicator) may be configured in the higher layer parameter SearchSpace to indicate that the PDCCH candidate (such as index a, b, c and d) in the SS set are used for PDCCH repetition rather than transmissions of control information or control channels. In addition, the number of PDCCH repetitions included in each PDCCH candidate may also be configured; and ALs corresponding to each PDCCH candidate may also be configured during configuration.

In addition, one or more CORESETs, SS sets or PDCCH candidates may be explicitly configured for PDCCH repetition through a higher layer parameter, and it does not limit transmissions of other control information or control channels, that is, other control information or control channels may also be transmitted through the above CORESETs, SS sets or PDCCH candidates, which may still reduce attempting ranges of combining and decoding each repetition version during PDCCH reception. In addition, it may also be indicated that one or more CORESETs, SS sets or PDCCH candidates include m repetition versions of PDCCH repetition (for example, m values corresponding to each CORESET, SS set or PDCCH candidate are different, where m=1, 2, 3, . . . ), and the terminal device may obtain more information when performing blind detection or blind combination through information configured by the network side device, which reduce blind combination number or blind detection number and ensure that the correct control information may be analyzed within a limited blind detection number. For example, the higher layer parameter repetition_pattern_specific (a higher layer parameter that is independent of the higher layer parameter ControlResourceSet or SearchSpace, or is not in the higher layer parameter ControlResourceSet or SearchSpace) s used for indicating that numbers of CORESET A, B and C capable for PDCCH repetition, including PDCCH repetition or included PDCCH repetition. Similarly, the repetition_pattern_specific indicates numbers of SS set i, j, k and l capable for PDCCH repetition, including PDCCH repetition or included PDCCH repetition. Similarly, the repetition_pattern_specific indicates numbers of PDCCH candidate indexes a, b, c and d for PDCCH repetition, including PDCCH repetition or included PDCCH repetition. In addition, ALs corresponding to each PDCCH candidate may be configured during configuration. In one embodiment, a higher layer parameter (such as repetition_indicator) is configured in the current higher layer parameter ControlResourceSet or SearchSpace to indicate the number of a certain CORESET or SS set capable for PDCCH repetition, including PDCCH repetition or included PDCCH repetition; a higher layer parameter (such as repetition_pattern_indicator) may also be configured in the higher layer parameter SearchSpace to indicate numbers of several PDCCH candidates (such as indexes a, b, c and d) in the SS set for PDCCH repetition, including PDCCH repetition or included PDCCH repetition. In addition, ALs corresponding to each PDCCH candidate may also be configured during configuration.

In addition, the network side device may also configure multiple associations (i.e., repetition formats) through radio resource control (RRC) signaling, and then activate one of the associations (formats) through media access control (MAC) control element (CE) signaling to increase flexibilities of network scheduling.

Embodiment 2: predefined rules or network side device configurations plus predefined rules.

In addition to displaying configurations of associations between PDCCH repetition versions, associations between each repetition version may also be established through predefined rules. By using the predefined rules, the terminal device may determine a CORESET, SS set or PDCCH candidate that PDCCH repetition versions may transmit, and attempt ranges of combining and decoding each repetition version during PDCCH reception is reduced.

The predefined rules may be as follows.

For example, multiple PDCCH repetition versions may be transmitted in SS sets having the same relative index of an SS set within different CORESETs. For example, CORESET 1 includes SS sets 1, 2 and 3, CORESET 2 includes SS sets 4, 5 and 6, then PDCCH repetition versions may be transmitted in SS sets 1 and 4, SS sets 2 and 5, or SS sets 3 and 6. That is, multiple possible SS sets have same relative indexes in their respective CORESETs (for example, SS set 4, 5 and 6 are absolute indexes, and their relative indexes in CORESET 2 are 1, 2 and 3 respectively).

For another example, multiple PDCCH repetition versions may be transmitted in SS sets having the same index of the relative SS set to be monitored in different CORESETs. For example, CORESET 1 includes SS sets 1, 2 and 3, CORESET 2 includes SS sets 4, 5 and 6. In a certain slot, SS sets 1, 2, 5 and 6 are SS set to be monitored, and PDCCH repetition versions may be transmitted in SS sets 1 and 5, or in SS sets 2 and 6. In the SS set to be monitored, SS set 5 corresponding to CORESET 2 has the lowest relative index, and SS set 6 has the second lowest relative index (that is, SS sets 5 and 6 are absolute indexes, and their relative indexes in the SS set to be monitored in CORESET 2 are 1 and 2 respectively).

For another example, multiple PDCCH repetition versions may be transmitted in PDCCH candidates having the same PDCCH candidate indexes in different SS sets. Multiple PDCCH candidates may have same ALs or different ALs, depending on the predefined rules.

For another example, multiple PDCCH repetition versions may be transmitted in PDCCH candidates having the same ALs within different CORESETs or SS sets. In this example, indexes of PDCCH candidates are not limited. During blind combination, the terminal device only needs to combine PDCCH candidates having the same ALs in different CORESETs or SS sets, and PDCCH candidates with different ALs do not need to be combined, which may also reduce the number of possible combinations in the combining. If the terminal device detects one repetition version of PDCCH in PDCCH candidates having one AL within one CORESET or SS set without performing combined decoding, PDCCH candidates having the same ALs in other CORESETs or SS sets need not to be detected again, and the number and complexity of blind detection are reduced.

For another example, multiple PDCCH repetition versions may be transmitted in PDCCH candidates having the same ALs within same CORESETs or SS sets.

For another example, mapping relationships of multiple repetition versions of PDCCH in multiple CORESETs, multiple SS sets or multiple PDCCH candidates may also be specified in the specification in advance, which is similar to a form of a HASH function. For example, in the specification, control channel elements (CCEs) that may be occupied by PDCCH candidates may be determined by a predefined mapping relationship, and the mapping relationship may also be modified to determine CCEs that may be transmitted by multiple repetition versions in multiple CORESETs, multiple SS sets or multiple PDCCH candidates. In this embodiment, all descriptions of PDCCH candidates may also be replaced with the CCEs occupied by the PDCCH candidates.

For another example, instead of providing CCEs that may be occupied by multiple repetition versions in the form similar to the HASH function, associations between indexes of multiple CORESETs, multiple SS sets or multiple PDCCH candidates are provided in the form similar to the HASH function. When performing blind combination, the terminal device will only combine CORESETs, SS sets or PDCCH candidates that meet the predefined relationship.

In addition to the predefined rules, a mode of combining network side device configurations with predefined rules may also be used, to further reduce attempting ranges of combining and decoding each repetition version during PDCCH reception. For example, PDCCH repetition versions that may be transmitted in multiple CORESETs, SS sets or PDCCH candidates are configured by the network side device based on the method of the first embodiment. Possible transmission ranges of PDCCH repetition versions is further reduced by the predefined rules in the second embodiment (for example, multiple SS sets need to have same relative indexes in addition to meeting configurations in the first embodiment, or PDCCH candidates need to have same ALs in addition to meeting configurations in the first embodiment, etc.).

For example, associations between multiple CORESETs or SS sets are configured by the network side device through RRC signaling, and then associations between PDCCH candidates are determined through predefined rules (such as same ALs, or predefined relationships between PDCCH candidate indexes).

This embodiment does not repeat the mode of combining network side device configurations with predefined rules, and supports combinations between the first embodiment and the second embodiment.

Embodiment 3: a time parameter/time information configuration.

In the existing specifications, SS set is configured with periodicity and offsets, and is not required to be monitored in every slot. When configuring associations of multiple CORESETs, multiple SS sets or multiple PDCCH candidates for transmission of multiple PDCCH repetition versions, it is also necessary to configure and indicate its time information.

The time information may include one or more sets of periodicity and/or offset. When a set of periodicity and/or offset is configured, it means that the configured CORESETs, SS sets or PDCCH candidates are within a time range (time window) determined by the set of periodicity and/or offset. When multiple sets of periodicity and/or offset are configured, each CORESET, SS set or PDCCH candidate has different periodicity and/or offset.

For example, in FIG. 3, associated SS sets are provided with a set of identical periodicity and/or offset. For example, based on the configuration of SearchSpace, each SS set has a to-be-monitored periodicity and/or offset. Monitored periodicitys of SS set 1, 2, 3 and 4 are 8 slots, 4 slots, 2 slots and 1 slot respectively. For example, repetition periodicitys configured by associations may be 4 slots. The thin wireframe in FIG. 3 represents a periodicity of PDCCH repetition. Within the repetition periodicity, SS set to be monitored are used for the transmission of the same PDCCH. Outside the repetition periodicity, PDCCHs carried by the SS set to be monitored and PDCCHs carried by SS sets in the repetition periodicity correspond to different DCI, or schedule different PDSCHs/PUSCHs. In addition, a repetition duration for the associated SS sets may also be configured. FIG. 3 is taken as another example, the thin wireframe represents a duration of PDCCH repetitions, such as 4 slots, and the repetition periodicity may be 8 slots. That is, repetition is repetition every 8 slots, and each repetition lasts for 4 slots. In one periodicity, in addition to the repetition, it may also be used for transmissions of other non-repetitions of the PDCCH (that is, slots or symbols outside the duration). The offset refers to the beginning of a first slot or symbol in the repetition periodicity. For example, in FIG. 3, if a configured periodicity is 4 slots, the duration is also 4 slots, and the offset is 3 slots; If a configured periodicity is 8 slots (the periodicity may be any value greater than or equal to the duration, such as 4, 5, 6, 7, 8, 12, 16 slots, etc.), the duration is also 4 slots. For different periodicities, offsets corresponding to the thin wireframe in FIG. 3 may be different.

Figure 5:
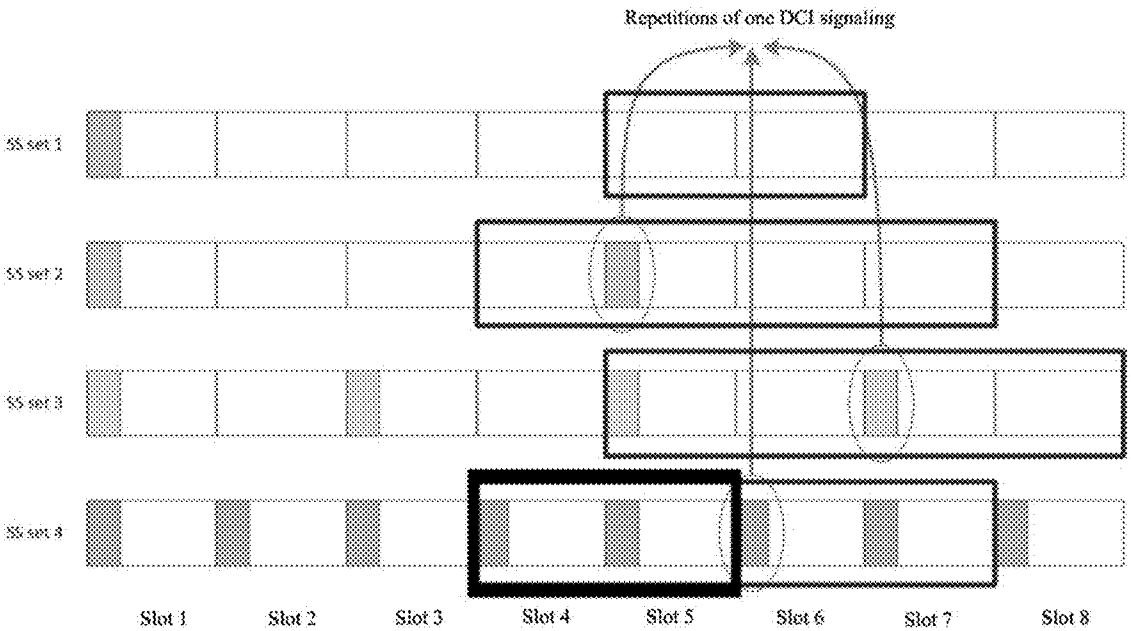
FIG. 5 is a schematic diagram for showing an erroneous association according to an embodiment of the present application.

For another example, in FIG. 4, associated SS sets are provided with multiple sets of periodicity and/or offset, that is, each SS set may have a set of periodicity and/or offset, and the sets of periodicity and/or offset are different from monitored periodicity and/or offset of SS sets. For example, the monitored periodicity of SS set 3 is 2 slots, while the repetition periodicity is 4 slots. However, slots and SS sets occupied by the repetition periodicity cannot be uniquely determined only by repetition periodicity and/or offset. For example, the repetition periodicity of SS set 4 is 2 slots. In FIG. 5, the terminal device cannot determine whether the transmission of SS set 4 in the thick wireframe and SS set 1, 2 and 3 in the thin wireframe correspond to the same DCI signaling or the same PDCCH repetition, or whether the transmission of SS set 4 in the thin wireframe and the transmission of SS set 1, 2 and 3 in the thin wireframe correspond to the same DCI signaling or the same PDCCH repetition, Therefore, it is also necessary to define a same time parameter to connect multiple SS sets, and to avoid wrong associations in FIG. 5 (such as mistakenly associating the thick wireframe part of SS set 4 with the thin wireframe part of SS set 1-3). For example, one mode is to define a parameter with the same periodicity and offset. It is first located on slot 6, and then it is determined that time information of associated SS sets is a periodicity including slot 6.

When multiple repetition versions are transmitted in only one SS set, methods of configuring one or more sets of periodicity and/or offset is similar, that is, it all indicate that one SS set is transmitted in the repeat periodicity. SS set 3 in FIG. 3 and FIG. 4 is taken as an example, the repeat periodicity or repeat duration is 4 slots, which means that different repetition versions of PDCCH are transmitted in only 4 slots of SS set 3. For example, it may be transmitted twice in SS set to be monitored 3.

The above time information configuration is also similar to associations between CORESETs or PDCCH candidates, which is determining the repetition range of a PDCCH by one or more sets of periodicity and/or offset, and PDCCHs within and outside this range correspond to different DCI signaling or schedule different PDSCHs/PUSCHs.

In addition, the time information configuration may further include relative index of slots where CORESETs, SS sets or PDCCH candidates are located. SS set 3 in FIG. 3 and FIG. 4 is taken as an example, the repeat periodicity or repeat duration is 4 slots, and 2 slots in a repetition periodicity or repetition duration may monitor SS set 3. It may be further indicated in the configuration that a slot 3 within one repetition periodicity or repetition duration of SS set 3 is used for PDCCH repetition, that is, corresponding to slot 7 in FIG. 3 and FIG. 4. Indications index of slots are beneficial to reduce ranges of blind detection or blind combination.

Embodiment 4: an action range of a time parameter/time information.

Figure 6:
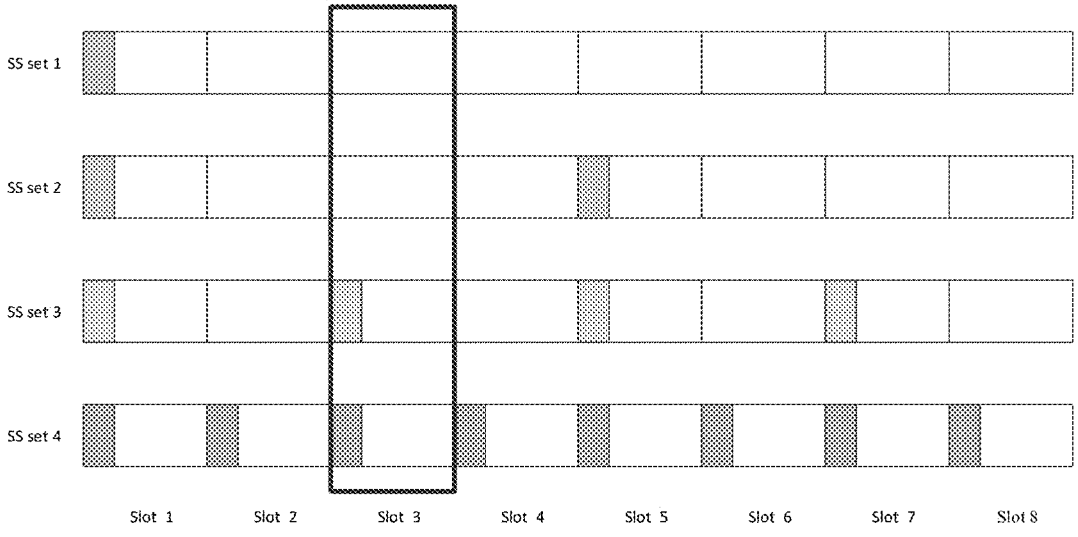
FIG. 6 is a schematic diagram for explaining an action range of a time parameter/time information according to an embodiment of the present application.

According to the embodiment 3, the network side device will configure a time parameter/time information for the terminal device, and the configured time information has periodicity and/or offset. FIG. 6 is taken as an example, a repetition periodicity configured by the network side device is slot 3. In slot 3, SS set 3 and SS set 4 are monitored SS sets, while SS set 1 and SS set 2 are non-monitored SS sets. It is necessary to clarify which SS sets PDCCH repetition may be transmitted in.

The PDCCH repetition may be specified to be only monitored in the SS set to be monitored during the repetition periodicity (that is, SS sets configured with a time parameter/time information and SearchSpace parameter, i.e., an intersection of two configurations) through a predefined mode 1. The terminal device may only monitor PDCCH repetition in the SS set to be monitored with a time parameter/time information and SearchSpace parameter.

The PDCCH repetition may also be specified to perform in all SS sets in the repetition periodicity through a predefined mode 2. That is, PDCCH repetition may be performed regardless of whether the SS set is configured as a SS set to be monitored by the SearchSpace parameter or not, i.e., a union of the time parameter/time information and the SS set configured by the SearchSpace parameter.

In addition, PDCCH repetitions may also be configured to switch by the terminal device between mode 1 and mode 2 through higher layer parameters. In addition, two transmission methods may also be configured through RRC signaling, and then MAC CE signaling is dynamically switched between the two methods. The network side device may flexibly indicate a certain terminal device to transmit PDCCH repetition versions in more SS sets (mode 2) or less SS sets (mode 1) based on user conditions it serves.

In addition, when configuring associations between CORESETs or PDCCH candidates, the above methods are also applicable, that is, an intersection or union may be taken based on CORESETs configured by time parameter/time information and time-domain locations of CORESETs determined by SearchSpace, or it may be configured or indicated to switch between the two methods by the network side device. The intersection or union may also be taken based on PDCCH candidates configured by time parameter/time information and time-domain locations of PDCCH candidates determined by SearchSpace in the time-domain, or it may be configured or indicated to switch between the two methods by the network side device.

In addition, the terminal device may also determine an actual repetition number according to the repetition number and the number of SS sets or PDCCH candidate. One scheme is that the actual repetition number is the number of CORESETs, SS sets or PDCCH candidates determined by associations, and each SS set carries a repetition. Another scheme is that the actual repetition number is equal to the configured number of repetitions. When the number of CORESETs, SS sets or PDCCH candidates determined by associations is greater than the configured number of repetitions, the terminal device determines to perform PDCCH repetition by using CORESETs, SS sets or PDCCH candidates with specific numbers. For example, SS sets with a smaller number may carry two or more repetitions.

Frequency-domain parameters of associations may also be configured for the terminal device. When the frequency-domain parameter is configured, it indicates that the actuating range of the PDCCH association is on an indicated BWP index or cell index, that is, multiple PDCCHs are transmitted on an indicated BWP or cell, or each PDCCH is transmitted on its own configured frequency-domain. Similar to the time-domain parameter, the configured frequency-domain parameters may be one set of frequency-domain parameters corresponding to all PDCCHs, or it may be multiple sets of frequency-domain parameters because each PDCCH has different frequency-domain parameters. When the frequency-domain parameter is not configured, the terminal device defaults that an actuating range of the PDCCH association configured by the network side device is a current BWP or an active BWP, that is, multiple PDCCHs are transmitted within the current BWP or the active BWP.

Area space parameters of associations may also be configured for the terminal device. For example, the area space parameter includes TCI states, indicating that the PDCCH is only transmitted by the terminal device in the configured TCI states or TCI state sets.

Embodiment 5

Referring to configurations of repetition time parameters/time information, the current higher layer parameter may be used without introducing a new higher layer parameter, such as the higher layer parameter SearchSpace. The CORESETs, SS sets or PDCCH candidates for PDCCH repetition is also determined by the higher layer parameter SearchSpace.

For example, SS sets for PDCCH repetition and SS sets for transmissions of other control signaling or control channels have the same periodicity and different offsets, and SS sets for PDCCH repetition and other SS sets are separated in time, which is convenient for the terminal device to combine and decode PDCCH repetition, and will not affect transmissions of other control channels or control signaling. A configuration of monitoring periodicity and offset is present in the current SearchSpace. In order to perform PDCCH repetitions simultaneously, two monitoring periodicities and offsets may be configured in the current SearchSpace, and each of them corresponding to one PDCCH repetition. For example, the two configurations have same periodicity and different offsets; or the two configurations have different periodicities and same offset; or periodicities and offsets of the two configurations are different. Corresponding relationships between each configuration and repetition of the PDCCH or non-repetition of the PDCCH may be predefined.

For example, a first configuration is for non-repetition of the PDCCH, a second configuration is for repetition of the PDCCH, and vice versa. In one embodiment, the corresponding relationships are configured by the network side device, that is, when configuring, the network side device indicates that the first configuration is for repetition of the PDCCH or non-repetition of the PDCCH, and the second configuration is for repetition of the PDCCH or non-repetition of the PDCCH. If the SS set in the two configurations overlaps in a certain slot, that is, a certain slot indicates the terminal device to monitor both repetition of the PDCCH and non-repetition of the PDCCH, it may be specified in the specification that repetition of the PDCCH or non-repetition of the PDCCH has a higher priority, so the network side device will only transmit PDCCHs with a higher priority, and the terminal device will only monitor PDCCH with a higher priority. In one embodiment, it may be specified in the specification in advance that both repetition of the PDCCH and non-repetition of the PDCCH will be performed in the overlapped slot. That is, when monitoring PDCCHs, the terminal device still need to continue to monitor even if one PDCCH is decoded, until all PDCCH candidates are decoded.

In addition, higher layer parameter repetition patterns and multiple periodicity and/or offset configuration of SearchSpace may be simultaneously used to configure PDCCH repetition. For example, higher layer parameters (such as repetition_pattern) are used for indicating associated CORESETs, SS sets or PDCCH candidates, and then multiple configurations in SearchSpace are used to determine time parameters/time information of associated CORESETs, SS sets or PDCCH candidates.

Embodiment 6

PDCCH repetition may have multiple transmission forms. For example, multiple PDCCH repetition versions are transmitted by multiple transmission reception points through time division multiplexing (TDM), frequency division multiplexing (FDM), and space division multiplexing (SDM), especially by multiple transmission reception points through single frequency network (SFN). It may be further subdivided into intra-CORESET division multiplexing, inter-CORESET division multiplexing, intra-slot division multiplexing, inter-slot division multiplexing, etc. Depending on different TCI states of PDCCH repetition, PDCCH repetition may also be divided into transmitting PDCCH repetition using two different TCI states in one CORESET, one SS set being associated with two different CORESETs and transmits PDCCH repetition using two different TCI states, or each SS set being associated with one CORESET transmit PDCCH repetition using one TCI states, etc.

Correlation determination methods in the embodiments 1 to 5 of the present application is applicable to the above PDCCH repetition methods. The terminal device may combine multiple repetition versions based on determined associations, thus reducing ranges or complexities of blind combination and/or blind detection. Even if the terminal device does not process multiple PDCCH repetition versions by combining, it may still reduce blind detection numbers with the help of associations (for example, if one PDCCH is decoded through one PDCCH candidate, there is no need to monitor PDCCH candidates associated with it).

Embodiment 7

If DCI signaling or a PDCCH is transmitted using two or more TCI states, for example, when they are transmitted on two or more TRPs, the methods in the embodiments 1 to 5 of the present application is also applicable. Correlations refers to associations between different parts of DCI signaling or a PDCCH. In addition to indicating associations, the network side device also needs to indicate other information to the terminal device, and to avoid the terminal device from performing detecting and decoding on part of DCI signaling.

Figure 7:
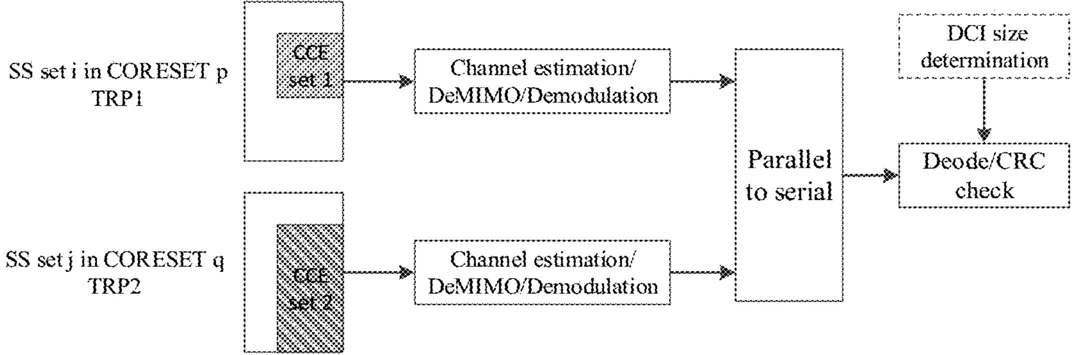
FIG. 7 is a schematic diagram illustrating that a terminal device concatenates bits on control channel elements (CCEs) of two search space (SS) sets and performs a decoding operation according to an embodiment of the present application.

A transmission of different parts of DCI signaling on two SS sets is taken as an example. FIG. 7 shows possible processing methods of the terminal device. The terminal device will concatenate bits on the CCE on the two SS sets together, and then perform a decoding operation. If only part of signaling on a SS set is decoded, the decoding will not be successful, so the network side device also needs to indicate the terminal device not to perform independent decoding.

A type of the SS set and to-be-monitored DCI format will be configured in the current SearchSpace configuration. If only part of DCI signaling is transmitted, the terminal device may add indication information for UE-specific DCI-Formats or DCI-FormatsExt-r16.

For example, the following may be added:

one part of formats0-0-And-1-0 one part of formats0-1-And-1-1 one part of formats0-2-And-1-2 one part of formats0-1-And-1-1And-0-2-And-1-2.

If different parts of DCI signaling are transmitted in the same SS set or CORESET, in addition to the above indications, the terminal device may also be notified by RRC signaling. For example, the terminal device is configured by RRC signaling to transmit multiple different parts of a DCI in SS sets or CORESETs; or the terminal device is configured in SearchSpace to combine and decode two PDCCH candidates (additional rules need to be defined, for example, when decoding, bits corresponding to PDCCH candidates having smaller indexes are placed in the a higher order, and bits corresponding to PDCCH candidates having larger indexes are placed in a lower order, and vice versa); or associations of multiple parts of DCI signaling are indicated in the SearchSpace configuration. In order to distinguish from the two DCI signaling repetitions, higher layer parameters used in association configuration may be distinguished from the case of two DCI signaling.

One embodiment of the present application is that the terminal device determines associations of resources used in PDCCH repetition based on the configuration of the network side device or predefined methods. Definitions of time parameters in associations, to-be-monitored resources jointly determined by the terminal device based on time parameters in the associations and periodicity and offset of SS sets, the network side device capable of configuring the terminal device with dedicated CORESETs, SS sets or PDCCH candidates for repetition, and the network side device capable of configuring a SS set with two to-be-monitored periodicity or offset for PDCCH repetition and non-repetition, and predefined rules for determining associations all fall within protecting scope of the present application. In the associations between PDCCH repetition versions determination mode of the present application, the terminal device may obtain a smaller detection range of PDCCH or DCI signaling, thus reducing ranges or complexities of blind combination and/or blind detection. Even if the terminal device does not process multiple PDCCH repetition versions by combining, it can still reduce blind detection numbers by using association determination methods of the present application. For example, if the terminal device decodes one PDCCH through one PDCCH candidate and need not to monitor PDCCH candidates associated with it.

Figure 8:
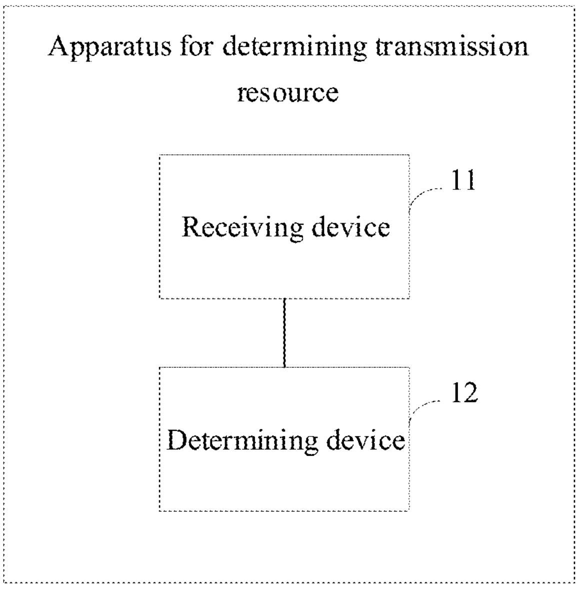
FIG. 8 is a block diagram of devices of an apparatus for determining a transmission resource used at a terminal device according to an embodiment of the present application.

As shown in FIG. 8, which is a block diagram of devices of an apparatus for determining a transmission resource applied to a terminal device according to an embodiment of the present application, the apparatus includes:

a receiving device 11, used to receive first configuration information transmitted by a network side device; and a determining device 12, used to determine an association between resources used by two or more repetitions of the PDCCH or determine the resources used by the two or more repetitions of the PDCCH based on one or more of the first configuration information, a first PDCCH association configured by the network side device and a predefined second PDCCH association.

It should be noted here that this apparatus may implement all the method steps applied to the terminal device implemented by the above-mentioned method embodiments, and can achieve the same effect. The parts and beneficial effects that are same as the those in the method embodiments will not be repeated here.

Figure 9:
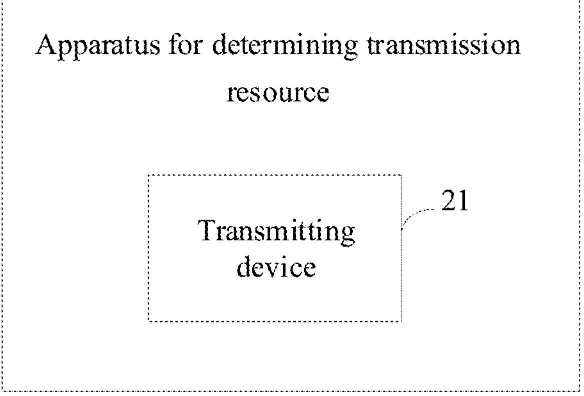
FIG. 9 is a block diagram of devices of an apparatus for determining a transmission resource used at a network side device according to an embodiment of the present application.

As shown in FIG. 9, which is a block diagram of devices of an apparatus for determining a transmission resource applied to a network side device according to an embodiment of the present application, the apparatus includes:

a transmitting device 21, used to transmit first configuration information to the terminal device, where the first configuration information is used for indicating a repetition of a physical downlink control channel (PDCCH), where the terminal device may determine an association between resources used by two or more repetitions of the PDCCH or determine the resources used by two or more repetitions of the PDCCH based on one or more of the first configuration information, a first PDCCH association configured by a network side device and a predefined second PDCCH association.

It should be noted here that this apparatus can implement all the method steps applied to the network side device implemented by the above-mentioned method embodiments, and can achieve the same effect. The parts and beneficial effects that are same as those in the method embodiments will not be repeated here.

Figure 10:
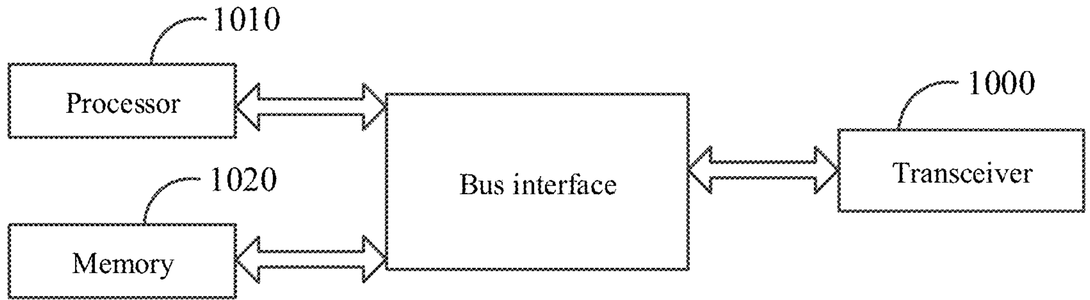
FIG. 10 is a schematic diagram of a structure of a terminal device according to an embodiment of the present application.

FIG. 10 is a schematic diagram of a structure of a terminal device according to an embodiment of the present application, which includes a memory 1020, a transceiver 1000, and a processor 1010.

In FIG. 10, the bus architecture can include any number of interconnected buses and bridges. Specifically, one or more processors represented by the processor 1010 and various circuits of memory represented by the memory 1020 are linked together. The bus architecture can also link various other circuits, such as peripheral devices, voltage regulators and power management circuits, which are well known in the art. Therefore, these will not be further described. The bus interface provides interface capabilities. The transceiver 1000 may be multiple elements, including a transmitter and a receiver. They provide a device for communicating with various other apparatuses on a transmission medium, including wireless channels, wired channels, optical cables and other transmission medium. The processor 1010 is responsible for managing the bus architecture and general processing, and the memory 1020 may store the data used by the processor 1010 when performing operations.

The processor 1010 may include a central processor (CPU), an application specific integrated circuit (ASIC), a field-programmable gate array (FPGA) or a complex programmable logic device (CPLD). The processor may also include multi-core architectures.

The memory 1020 is used to store a computer program, the transceiver 1000 is used to transmit and receive data under a control of the processor, and the computer program, when executed by the processor 1010, causes the processor 1010 to perform the following operations of:

receiving first configuration information transmitted by a network side device, where the first configuration information is used for indicating a repetition of a PDCCH; and determining an association between resources used by two or more repetitions of the PDCCH or determining the resources used by the two or more repetitions of the PDCCH based on one or more of the first configuration information, a first PDCCH association configured by the network side device and a predefined second PDCCH association.

Based on the above embodiments, the PDCCH association configured by the network side device includes a PDCCH association between the resources used by two or more repetitions of the PDCCH configured by the network side device.

Based on the above embodiments, the predefined PDCCH association includes the predefined PDCCH association between the resources used by two or more repetitions of the PDCCH.

Based on the above embodiments, the PDCCH association configured by the network side device includes one or more of:

two or more CORESET indexes;

two or more SS set indexes;

two or more PDCCH candidate indexes;

an aggregation level of a SS set and/or a PDCCH candidate; and the given one of PDCCH association patterns configured by the network side device.

Based on the above embodiments, the PDCCH association configured by the network side device further includes one or more of:

a time-domain parameter;

a frequency-domain parameter; and a repetition number.

Based on the above embodiments, the time-domain parameter includes one or more of:

periodicity and/or offset; and slot information.

Based on the above embodiments, the frequency-domain parameters include one or more of:

a BWP index; and a cell index.

Based on the above embodiments, the periodicity and/or offset include:

a set of periodicity and/or offset for indicating same periodicity and/or offset of the two or more CORESET indexes, the two or more SS set indexes or the two or more PDCCH candidate indexes; and two or more sets of periodicity and/or offset for indicating periodicity and/or offset of each CORESET index in the two or more CORESET indexes, periodicity and/or offset of each SS set index in the two or more SS set indexes or periodicity and/or offset of each PDCCH candidate index in the two or more PDCCH candidate indexes, respectively.

Based on the above embodiments, the computer program, when executed by the processor, further cause the processor to:

determining one or more of a SS set to be monitored, a PDCCH candidate and a CORESET based on a periodicity and/or offset configured by a higher layer parameter and a periodicity and/or offset configured for the SS set.

Based on the above embodiments, the determining the one or more of the SS set to be monitored, the PDCCH candidate and the CORESET based on the periodicity and/or offset configured by the higher layer parameter and the periodicity and/or offset configured for the SS set includes any one of:

determining the one or more of the SS set to be monitored, the PDCCH candidate or the CORESET as an intersection of the periodicity and/or offset configured by the higher layer parameter and the periodicity and/or offset configured for the SS set; and determining one or more of the SS set to be monitored, the PDCCH candidate or the CORESET as a union of the periodicity and/or offset configured by the higher layer parameter and the periodicity and/or offset configured for the SS set.

Based on the above embodiments, the computer program, when executed by the processor, causes the processor further to perform the operation of:

determining the number of the determined one or more of the SS set to be monitored, the PDCCH candidate and the CORESET as an actual repetition number.

Based on the above embodiments, the determining the number of the determined one or more of the SS set to be monitored, the PDCCH candidate and the CORESET as an actual repetition number includes any one of:

determining the number of the determined one or more of the SS set to be monitored, the PDCCH candidate and the CORESET as the actual repetition number, and one or more of each SS set, each PDCCH candidate and each CORESET carry one repetition; and determining a predefined repetition number as the actual repetition number, and determining that a SS set or a PDCCH candidate with a smaller index carries two or more repetitions in case that the number of SS sets or PDCCH candidates is less than the predefined repetition number.

Based on the above embodiments, the time-domain parameter includes one or more of:

two or more sets of periodicity and/or offset corresponding to a CORESET, and one or more sets of periodicity and/or offset in the two or more sets of periodicity and/or offset correspond to a repetition of the PDCCH, and one or more sets of periodicity and/or offset in the two or more sets of periodicity and/or offset correspond to a non-repetition of the PDCCH;

two or more sets of periodicity and/or offset corresponding to a SS set, and one or more sets of periodicity and/or offset in the two or more sets of periodicity and/or offset correspond to a repetition of the PDCCH, and one or more sets of periodicity and/or offset in the two or more sets of periodicity and/or offset correspond to a non-repetition of the PDCCH; and two or more sets of periodicity and/or offset corresponding to a PDCCH candidate, and one or more sets of periodicity and/or offset in the two or more sets of periodicity and/or offset correspond to a repetition of the PDCCH, and one or more sets of periodicity and/or offset in the two or more sets of periodicity and/or offset correspond to a non-repetition of the PDCCH.

Based on the above embodiments, the slot information includes one or more of:

an index of a slot where a CORESET is located;

an index of a slot where a SS set is located; and an index of a slot where a PDCCH candidate is located.

Based on the above embodiments, the first PDCCH association includes one or more of:

two or more dedicated CORESET indexes;

two or more dedicated SS set indexes;

two or more dedicated PDCCH candidate indexes; and one or more of dedicated CORESET index, SS set index and PDCCH candidate index.

Based on the above embodiments, the first configuration information is used for indicating one or more of:

the repetition of the PDCCH corresponding to the same DCI;

the repetition of the PDCCH corresponding to different parts of the same DCI;

the repetition of the PDCCH corresponding to different DCI;

the repetition of the PDCCH corresponding to two or more DCI with different information fields or different DCI formats;

a repetition of a PDCCH corresponding to two or more DCI for scheduling the same physical downlink shared channel (PDSCH) or the same physical uplink shared channel (PUSCH);

the repetition of the PDCCH corresponding to DCI with the same purpose; and a PDCCH multiplexing transmission scheme being one or more of: time division multiplexing, frequency division multiplexing, space division multiplexing, intra-CORESET multiplexing, inter-CORESET multiplexing, intra-slot multiplexing and inter-slot multiplexing.

Based on the above embodiments, the predefined PDCCH association includes one or more of:

the PDCCH is transmitted in SS sets having the same relative index of an SS set in different CORESETs;

the PDCCH is transmitted in SS sets having the same relative index of an SS set to be monitored in different CORESETs;

the PDCCH is transmitted in PDCCH candidates having the same PDCCH candidate index in different SS sets, where the PDCCH candidates have the same aggregation level or different aggregation levels;

the PDCCH is transmitted in PDCCH candidates having the same aggregation level in different CORESETs or SS sets;

the PDCCH is transmitted in PDCCH candidates having the same aggregation level in the same CORESETs or SS sets;

a mapping relationship between the repetition PDCCH and the multiple CORESETs, multiple SS sets or multiple PDCCH candidates; and an association among multiple CORESET indexes, multiple SS set indexes and multiple PDCCH candidate indexes.

It should be noted here that the terminal device according to embodiments of the present application can implement all the method steps applied to the terminal device implemented by the above-mentioned method embodiments, and can achieve the same effect. The same parts and beneficial effects that are same as those in the method embodiments will not be repeated here.

Figure 11:
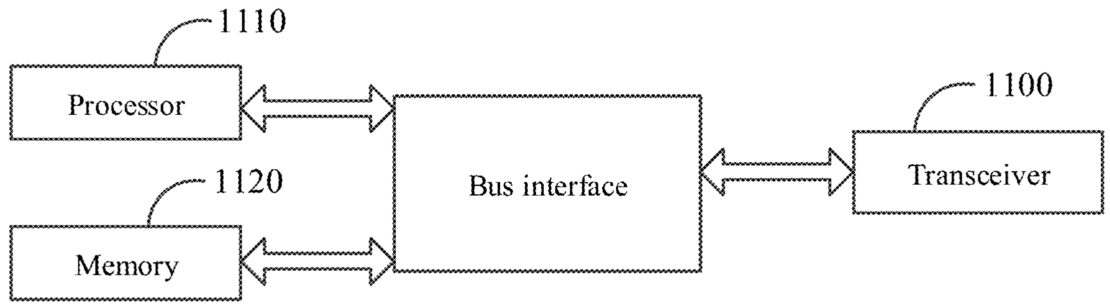
FIG. 11 is a schematic diagram of a structure of a network side device according to an embodiment of the present application.

FIG. 11 is a schematic diagram of structure of the network side device according to an embodiment of the present application, which includes a memory 1120, a transceiver 1100, and a processor 1110.

In FIG. 11, the bus architecture may include any number of interconnected buses and bridges. Specifically, one or more processors represented by the processor 1110 and various circuits of memory represented by the memory 1120 are linked together. The bus architecture can also link various other circuits, such as peripheral devices, voltage regulators and power management circuits, which are well known in the art. Therefore, these will not be further described. The bus interface provides interface capabilities. The transceiver 1100 may include multiple elements, including a transmitter and a receiver. They provide a device for communicating with various other apparatuses on a transmission medium, including wireless channels, wired channels, optical cables and other transmission medium. The processor 1110 is responsible for managing the bus architecture and general processing, and the memory 1120 may store the data used by the processor 1110 when performing operations.

The processor 1110 may include a central processor (CPU), an application specific integrated circuit (ASIC), a field-programmable gate array (FPGA) or a complex programmable logic device (CPLD). The processor may also include multi-core architectures.

The memory 1120 is used to store a computer program, the transceiver 1100 is used to transmit and receive data under a control of the processor, and the processor 1110 is configured to read the computer program in the memory and perform the following operations:

transmitting first configuration information to the terminal device, where the first configuration information is used for indicating a repetition of a PDCCH, and the terminal device determines an association between resources used by two or more repetitions of the PDCCH or determine the resources used by two or more repetitions of the PDCCH based on one or more of the first configuration information, a first PDCCH association configured by a network side device and a predefined second PDCCH association.

Based on the above embodiments, the PDCCH association configured by the network side device includes a PDCCH association between the resources used by two or more repetitions of the PDCCH configured by the network side device.

Based on the above embodiments, the predefined PDCCH association includes the predefined PDCCH association between the resources used by two or more repetitions of the PDCCH.

Based on the above embodiments, the PDCCH association configured by the network side device includes one or more of:

- two or more CORESET indexes;
- two or more SS set indexes;
- two or more PDCCH candidate indexes;
- an aggregation level of SS set and/or PDCCH candidate; and
- the given one of PDCCH association patterns configured by the network side device.

Based on the above embodiments, the PDCCH association configured by the network side device further includes one or more of:

- a time-domain parameter;
- a frequency-domain parameter; and
- a repetition number.

Based on the above embodiments, the time-domain parameter includes one or more of:

- periodicity and/or offset; and
- slot information.

Based on the above embodiments, the frequency-domain parameters include one or more of:

- a BWP index; and
- a cell index.

Based on the above embodiments, the periodicity and/or offset include:

- a set of periodicity and/or offset for indicating same periodicity and/or offset of the two or more CORESET indexes, the two or more SS set indexes or the two or more PDCCH candidate indexes; and
- two or more sets of periodicity and/or offset for indicating periodicity and/or offset of each CORESET index in of the two or more CORESET indexes, periodicity and/or offset of each SS set index in the two or more SS set indexes or periodicity and/or offset of each PDCCH candidate index in the two or more PDCCH candidate indexes, respectively.

Based on the above embodiments, the time-domain parameter includes one or more of:

- two or more sets of periodicity and/or offset corresponding to a CORESET, and one or more sets of periodicity and/or offset in the two or more sets of periodicity and/or offset correspond to a repetition of the PDCCH, and one or more sets of periodicity and/or offset in the two or more sets of periodicity and/or offset correspond to a non-repetition of the PDCCH;
- two or more sets of periodicity and/or offset corresponding to a SS set, and one or more sets of periodicity and/or offset in the two or more sets of periodicity and/or offset correspond to a repetition of the PDCCH, and one or more sets of periodicity and/or offset in the two or more sets of periodicity and/or offset correspond to a non-repetition of the PDCCH; and
- two or more sets of periodicity and/or offset corresponding to a PDCCH candidate, and one or more sets of periodicity and/or offset in the two or more sets of periodicity and/or offset correspond to a repetition of the PDCCH, and one or more sets of periodicity and/or offset in the two or more sets of periodicity and/or offset correspond to a non-repetition of the PDCCH.

Based on the above embodiments, the slot information includes one or more of:

- an index of a slot where a CORESET is located;
- an index of a slot where a SS set is located; and
- an index of a slot where a PDCCH candidate is located.

Based on the above embodiments, the first PDCCH association includes one or more of:

- two or more dedicated CORESET indexes;
- two or more dedicated SS set indexes;
- two or more dedicated PDCCH candidate indexes; and
- one or more of dedicated CORESET index, SS set index and PDCCH candidate index.

Based on the above embodiments, the first configuration information is used for indicating one or more of:

- the repetition of the PDCCH corresponding to the same DCI;
- the repetition of the PDCCH corresponding to different parts of the same DCI;
- the repetition of the PDCCH corresponding to different DCI;
- the repetition of the PDCCH corresponding to two or more DCI with different information fields or different DCI formats;
- a repetition of a PDCCH corresponding to two or more DCI for scheduling the same physical downlink shared channel (PDSCH) or the same physical uplink shared channel (PUSCH);

the repetition of the PDCCH corresponding to DCI with the same purpose; and a PDCCH multiplexing transmission scheme being one or more of: time division multiplexing, frequency division multiplexing, space division multiplexing, intra-CORESET multiplexing, inter-CORESET multiplexing, intra-slot multiplexing and inter-slot multiplexing.

Based on the above embodiments, the predefined PDCCH association includes one or more of:

the PDCCH is transmitted in SS sets having the same relative index of an SS set in different CORESETs;

the PDCCH is transmitted in SS sets having the same relative index of an SS set to be monitored in different CORESETs;

the PDCCH is transmitted in PDCCH candidates having the same PDCCH candidate index in different SS sets, where the PDCCH candidates have same aggregation level or different aggregation levels;

the PDCCH is transmitted in PDCCH candidates having the same aggregation level in different CORESETs or SS sets;

the PDCCH is transmitted in PDCCH candidates having the same aggregation level in the same CORESETs or SS sets;

a mapping relationship between the repetition PDCCH and the multiple CORESETs, multiple SS sets or multiple PDCCH candidates; and an association among the multiple CORESET indexes, multiple SS set indexes and multiple PDCCH candidate indexes.

It should be noted here that the network side device according to this embodiment can implement all the method steps applied to the network side device implemented by the above-mentioned method embodiments, and can achieve the same effect. The parts and beneficial effects that are same as those in the method embodiments will not be repeated here.

The division of devices in the embodiments of the present application is schematic and is only a logical function division. There may be other division methods in actual implementation. In addition, each functional device in each embodiment of the present application may be integrated in one processing device, or each device may exist physically alone, or two or more devices may be integrated in one device. The above integrated devices may be implemented in the form of hardware or software functional devices.

If the integrated device is implemented in the form of software functional device and sold or used as an independent product, it may be stored in a processor readable storage medium. Based on this understanding, the solutions of the present application may be embodied in the form of software products, which are stored in a storage medium, including several instructions to cause a computer device (which may be a personal computer, a server, a network side device, etc.) or a processor to perform all or part of the steps of the method described in the embodiments of the present application. The aforementioned storage medium includes: a USB flash disk, a removable hard disk, a read-only memory (ROM), a random access memory (RAM), a magnetic disk or an optical disk and other medium that may store program code.

The above apparatuses according to the embodiments of the present application can implement all the method steps implemented by the above-mentioned method embodiments, and can achieve the same effect. The same parts and beneficial effects as the same method embodiments will not be repeated here.

An embodiment of the present application further provides a processor readable storage medium having a computer program stored thereon that, when executed by the processor, cause the processor to perform the steps of the above-mentioned embodiments.

The processor readable storage medium may be any available medium or data storage device that may be accessed by the computer, including but not limited to, a magnetic storage (e.g., a floppy disk, a hard disk, a magnetic tape, a magneto-optical disk (MO), etc.), optical memory (such as CD, DVD, BD, HVD, etc.), and a semiconductor memory (such as ROM, EPROM, EEPROM, non-volatile memory (NAND FLASH), solid-state drive (SSD)), etc.

It may be seen from the above embodiments that the processor readable storage medium stores a computer program which when executed by the processor, cause the processor to perform the steps of the above-mentioned methods for determining a transmission resource.

Embodiments of the present application may be provided as methods, systems, or computer program products. Therefore, the present application may take the form of a complete hardware embodiment, a complete software embodiment, or an embodiment combining software and hardware. Furthermore, the present application may take the form of computer program products implemented on one or more computer available storage medium (including but not limited to a disk memory, an optical memory, etc.) including computer available program codes.

The present application is described with reference to the flowchart and/or block diagram of the method, device (system), and computer program product according to the embodiment of the present application. It should be understood that each flow and/or block in the flow chart and/or block diagram and the combination of flow and/or block in the flow chart and/or block diagram may be realized by computer executable instructions. These computer executable instructions may be provided to the processors of general-purpose computers, special purpose computers, embedded processors or other programmable data processing devices to generate a machine, and the instructions executed by the processors of computers or other programmable data processing devices generate devices for realizing the functions specified in one or more processes and/or one or more blocks of a flowchart.

These processor executable instructions may also be stored in the processor readable memory that may guide the computer or other programmable data processing devices to operate in a specific way, and the instructions stored in the processor readable memory generate a manufacturing product including an instruction device, which implements the functions specified in one or more flows and/or one or more blocks of the flowchart.

These processor executable instructions may also be loaded on a computer or other programmable data processing device to cause a series of operation steps to be performed on a computer or other programmable device to generate computer-implemented processing, and the instructions executed on a computer or other programmable device provide steps for implementing the functions specified in one or more flows and/or one or more blocks of the flowchart.

What is claimed is:

1. A method for determining a transmission resource, comprising:

receiving first configuration information transmitted by a network side device, wherein the first configuration information is used for indicating a repetition of a physical downlink control channel (PDCCH); and determining, based on a first PDCCH association configured by the network side device and a predefined second PDCCH association, an association between two or more repetitions of PDCCH, wherein the first PDCCH association comprises an association between two or more search space set (SS set) indexes; periodicities and offsets of the two or more SS set are same, and the second PDCCH association comprises: the PDCCH is transmitted in PDCCH candidates having a same PDCCH candidate index in different SS sets, wherein the PDCCH candidates having the same PDCCH candidate index have a same aggregation level.

2. The method of claim 1, further comprising:

determining one or more of a SS set to be monitored, a PDCCH candidate and a CORESET based on a periodicity and/or offset configured by a higher layer parameter and a periodicity and/or offset configured for the SS set;

wherein the determining the one or more of the SS set to be monitored, the PDCCH candidate and the CORESET based on the periodicity and/or offset configured by the higher layer parameter and the periodicity and/or offset configured for the SS set comprises any one of:

determining the one or more of the SS set to be monitored, the PDCCH candidate or the CORESET as an intersection of the periodicity and/or offset configured by the higher layer parameter and the periodicity and/or offset configured for the SS set; and determining one or more of the SS set to be monitored, the PDCCH candidate or the CORESET as a union of the periodicity and/or offset configured by the higher layer parameter and the periodicity and/or offset configured for the SS set.

3. The method of claim 2, further comprising:

determining the number of the determined one or more of the SS set to be monitored, the PDCCH candidate and the CORESET as an actual repetition number;

wherein the determining the number of the determined one or more of the SS set to be monitored, the PDCCH candidate and the CORESET as an actual repetition number comprises any one of:

determining the number of the determined one or more of the SS set to be monitored, the PDCCH candidate and the CORESET as the actual repetition number, wherein one or more of each SS set, each PDCCH candidate and each CORESET carry one repetition; and determining a predefined repetition number as the actual repetition number, and determining that a SS set or a PDCCH candidate with a smaller index carries two or more repetitions in case that the number of SS sets or PDCCH candidates is less than the predefined repetition number.

4. The method of claim 1, wherein the first PDCCH association further comprises:

two or more dedicated SS set indexes.

5. The method of claim 1, wherein the first configuration information is used for indicating one or more of:

the repetition of the PDCCH corresponding to same DCI;

the repetition of the PDCCH corresponding to different parts of same DCI;

the repetition of the PDCCH corresponding to different DCI;

the repetition of the PDCCH corresponding to two or more DCI with different information fields or different DCI formats;

the repetition of the PDCCH corresponding to two or more DCI for scheduling the same physical downlink shared channel (PDSCH) or the same physical uplink shared channel (PUSCH);

the repetition of the PDCCH corresponding to DCI with the same purpose; and a PDCCH multiplexing transmission scheme being one or more of: time division multiplexing, frequency division multiplexing, space division multiplexing, intra-CORESET multiplexing, inter-CORESET multiplexing, intra-slot multiplexing and inter-slot multiplexing.

6. A method for determining a transmission resource, comprising:

transmitting first configuration information to a terminal device, wherein the first configuration information is used for indicating a repetition of a physical downlink control channel (PDCCH), wherein a first PDCCH association configured by a network side device and a predefined second PDCCH association are used for determining an association between two or more repetitions of PDCCH, wherein the first PDCCH association comprises an association between two or more search space set (SS set) indexes; periodicities and offsets of the two or more SS set are same, and the second PDCCH association comprises: the PDCCH is transmitted in PDCCH candidates having a same PDCCH candidate index in different SS sets, wherein the PDCCH candidates having the same PDCCH candidate index have a same aggregation level.

7. The method of claim 6, wherein the first configuration information is used for indicating one or more of:

the repetition of the PDCCH corresponding to same DCI;

the repetition of the PDCCH corresponding to different parts of same DCI;

the repetition of the PDCCH corresponding to different DCI;

the repetition of the PDCCH corresponding to two or more DCI with different information fields or different DCI formats;

the repetition of the PDCCH corresponding to two or more DCI for scheduling the same physical downlink shared channel (PDSCH) or the same physical uplink shared channel (PUSCH);

the repetition of the PDCCH corresponding to DCI with the same purpose; and a PDCCH multiplexing transmission scheme being one or more of: time division multiplexing, frequency division multiplexing, space division multiplexing, intra-CORESET multiplexing intra-CORESET multiplexing, intra-slot multiplexing and inter-slot multiplexing.

8. A network side device, comprising a memory, a processor and a computer program stored on the memory and executable by the processor, wherein the computer program, when executed by the processor, causes the processor to perform the method of claim 6.

9. A terminal device, comprising a memory, a processor and a computer program stored on the memory and executable by the processor, wherein the computer program, when executed by the processor, cause the processor to:

receive first configuration information transmitted by a network side device, wherein the first configuration information is used for indicating a repetition of a physical downlink control channel (PDCCH); and determine, based on a first PDCCH association configured by the network side device and a predefined second PDCCH association, an association between two or more repetitions of PDCCH, wherein the first PDCCH association comprises an association between two or more search space set (SS set) indexes; periodicities and offsets of the two or more SS set are same, and the second PDCCH association comprises: the PDCCH is transmitted in PDCCH candidates having a same PDCCH candidate index in different SS sets, wherein the PDCCH candidates having the same PDCCH candidate index have a same aggregation level.

* * * * *